(12) United States Patent
Yasuda et al.

(10) Patent No.: US 12,043,734 B2
(45) Date of Patent: Jul. 23, 2024

(54) SHEET-FORM INSULATING VARNISH AND PRODUCING METHOD THEREFOR, ELECTRICAL DEVICE, AND ROTARY ELECTRIC MACHINE

(71) Applicant: Mitsubishi Electric Corporation, Tokyo (JP)

(72) Inventors: Naoki Yasuda, Tokyo (JP); Shiori Natori, Tokyo (JP); Kazuya Hasegawa, Tokyo (JP); Shogo Okamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 925 days.

(21) Appl. No.: 16/935,320

(22) Filed: Jul. 22, 2020

(65) Prior Publication Data
US 2021/0130603 A1 May 6, 2021

(30) Foreign Application Priority Data

Oct. 31, 2019 (JP) .................................. 2019-198174

(51) Int. Cl.
*C08L 63/00* (2006.01)
*C08K 3/22* (2006.01)
(Continued)

(52) U.S. Cl.
CPC .............. *C08L 63/00* (2013.01); *C08L 67/00* (2013.01); *C08K 2003/2227* (2013.01); *C08K 2003/265* (2013.01); *C08K 3/36* (2013.01); *C08K 2201/003* (2013.01)

(58) Field of Classification Search
CPC ...... C08L 67/06; C08L 63/00–10; H02K 3/30
See application file for complete search history.

(56) References Cited

U.S. PATENT DOCUMENTS 5,984,647 A 11/1999 Miyamoto et al.
6,376,923 B1 * 4/2002 Sumita ................. H01L 23/296
257/789
(Continued)

FOREIGN PATENT DOCUMENTS

CN 102725323 A 10/2012
CN 108137947 A 6/2018
(Continued)

OTHER PUBLICATIONS

Communication dated Nov. 24, 2020 from the Japanese Patent Office in Application No. 2019-198174.
(Continued)

*Primary Examiner* — Kregg T Brooks
(74) *Attorney, Agent, or Firm* — Sughrue Mion, PLLC; Richard C. Turner

(57) ABSTRACT

The thermosetting resin composition is used for a sheet-form insulating varnish to be disposed in a gap between insulation target members, and contains: a thermosetting resin (A) that is in solid form at 25° C.; a thermosetting resin (B) that is in liquid form at 25° C.; a latent curing agent that is unreactive at 60° C. or lower; and an inorganic filler having a maximum particle diameter smaller than a dimension of the gap and having an average particle diameter smaller than 0.5 times the dimension of the gap. 30 parts by mass to 70 parts by mass of the thermosetting resin (A) is contained per a total of 100 parts by mass of the thermosetting resin (A) and the thermosetting resin (B). A volume ratio of the inorganic filler to an entirety of the composition is not higher than 50%.

17 Claims, 5 Drawing Sheets

(51) Int. Cl.
    *C08K 3/26*     (2006.01)
    *C08K 3/36*     (2006.01)
    *C08L 67/00*     (2006.01)

(56) References Cited

U.S. PATENT DOCUMENTS

| | | | |
|---|---|---|---|
| 2015/0116970 A1* | 4/2015 | Kishi | H01L 24/81 361/773 |
| 2018/0258313 A1 | 9/2018 | Yasuda et al. | |
| 2019/0149005 A1 | 5/2019 | Yamaguchi et al. | |

FOREIGN PATENT DOCUMENTS

| | | | |
|---|---|---|---|
| EP | 0673957 A2 * | 9/1995 | |
| JP | 10-060084 A | 3/1998 | |
| JP | 10-285886 A | 10/1998 | |
| JP | 11299156 A | 10/1999 | |
| JP | 2000-044636 A | 2/2000 | |
| JP | 5157296 B2 | 3/2013 | |
| JP | 2015-074710 A | 4/2015 | |
| JP | 2016-017079 A | 2/2016 | |
| JP | 2019-092250 A | 6/2019 | |

OTHER PUBLICATIONS

Communication issued Nov. 3, 2021 from the China National Intellectual Property Administration in Chinese Application No. 202011144108.X.

\* cited by examiner

SHEET-FORM INSULATING VARNISH AND PRODUCING METHOD THEREFOR, ELECTRICAL DEVICE, AND ROTARY ELECTRIC MACHINE

BACKGROUND OF THE INVENTION

Field of the Invention

The present disclosure relates to a thermosetting resin composition, a sheet-form insulating varnish and a producing method therefor, an electrical device, and a rotary electric machine.

Description of the Background Art

In the field of electrical devices including electronic devices provided with a semiconductor module, a power module, a power source device, and the like, and the field of rotary electric machines including electric motors, power generators, compressors, and the like, demand for insulation and thermal dissipation has been intensified in association with size reduction and output increase. Therefore, insulating materials disposed in gaps between members composing electrical devices and rotary electric machines are required to have high insulation properties and thermal dissipation properties.

In an electrical device, an insulating material is disposed in a gap between a substrate and a heat-generating part such as a semiconductor chip, a diode, a transformer, or a coil, or in a gap between the substrate and a housing. In the case where the insulating material is disposed in the gap between the members, if an air space partially remains, the air space causes deterioration in insulation properties, thermal dissipation properties, and vibration resistance. In particular, the problem in thermal dissipation is serious in a cosmic device for use under vacuum at a thermal conductivity of 0.

In addition, improvement in coil insulation performance is essential to realize size reduction and output increase of a rotary electric machine. When a coil is accommodated in a slot of a stator core, an insulating paper sheet is inserted in a gap between the coil and the inner wall of the slot, and the coil is impregnated with a liquid insulating varnish. However, the gaps for the coil, the inner wall of the slot, and the insulating paper sheet are narrowed in association with increase in the space factor of stator windings, whereby a problem arises in that the insulating varnish does not sufficiently permeate and partial fixation occurs. As a result, coil fixation performance deteriorates, and the long-term insulation reliability is adversely influenced. In particular, in the case of a rotary electric machine for an automobile, this problem is a factor in deterioration in terms of noise, vibration, and harshness (hereinafter, referred to as "NVH properties") which are one type of measure for inferring the comfort in the automobile.

Patent Document 1 proposes a method for fixing, in an insulating manner, a coil to a stator core without impregnating the coil with an insulating varnish. In this conventional technique, an insulation film base material, on both surfaces of which thermosetting resins in a semi-cured state are stacked, is used, and insulation fixation resins resulting from curing the thermosetting resins in a semi-cured state are packed between the insulation film base material and the coil and between the insulation film base material and the inner wall of a slot.

Patent Document 1: Japanese Patent No. 5157296

In the above-described Patent Document 1, each thermosetting resin in a semi-cured state is formed from an epoxy resin or the like, and the insulation film base material is formed from a resin such as polyethylene naphthalate (PEN), polyethylene terephthalate (PET), or polyimide (PI). However, the compositions and the physical properties thereof are not described in detail at all. In addition, no evaluation was performed regarding flexibility and fluidity properties of the thermosetting resin, and it is unclear whether the thermosetting resin has a characteristic of flowing at the time of heating to permeate a narrow space between the members. In addition, although the thickness of the insulation film base material is set to 25 μm to 150 μm, no mention is made regarding the relationship between the thickness of the insulation film base material and the dimension of the gap in which the insulation film base material is disposed.

Therefore, it would not be easy for a person skilled in the art to assuredly fill a gap, and also a narrow space in the gap, between members by using the insulation film base material disclosed in Patent Document 1. If the total thickness of the cured thermosetting resin and the insulation film base material is smaller than the dimension of the gap, the gap cannot be sufficiently filled and an air space partially remains, whereby insulation properties and thermal dissipation properties deteriorate. Meanwhile, if the total thickness is larger than the dimension of the gap, assimilability and workability may become poor, and reliability may deteriorate. In the case of a rotary electric machine, if the thickness of an insulation film base material is larger than the dimension of a gap between a coil and a stator core, a work of inserting the coil into a slot becomes difficult to perform.

SUMMARY OF THE INVENTION

The present disclosure discloses a technology for solving the above-described problems, and an object of the present disclosure is to provide a thermosetting resin composition used for a sheet-form insulating varnish capable of: assuredly filling a gap, and also a narrow space in the gap, between insulation target members; and insulating and fixing both members. In addition, an object of the present disclosure is to provide a sheet-form insulating varnish formed from the above-described thermosetting resin composition, and a producing method for the sheet-form insulating varnish.

Furthermore, an object of the present disclosure is to, by using the above-described sheet-form insulating varnish, improve insulation reliability, thermal dissipation property, and vibration resistance, and realize size reduction and output increase of an electrical device. Moreover, an object of the present disclosure is to, by using the above-described sheet-form insulating varnish, improve insulation reliability, thermal dissipation property, and vibration resistance, and realize size reduction and output increase of a rotary electric machine.

A thermosetting resin composition according to the present disclosure is a thermosetting resin composition for a sheet-form insulating varnish to be disposed in a gap between insulation target members, at least a part of the gap having a fixed dimension. The thermosetting resin composition contains: a thermosetting resin (A) that is in solid form at 25° C.; a thermosetting resin (B) that is in liquid form at 25° C.; a latent curing agent that is unreactive at 60° C. or lower; and an inorganic filler having a maximum particle diameter smaller than the dimension of the gap and having an average particle diameter smaller than 0.5 times the dimension of the gap. 30 parts by mass to 70 parts by mass of the thermosetting resin (A) is contained per a total of 100 parts by mass of the thermosetting resin (A) and the thermosetting resin (B). A volume ratio of the inorganic filler to an entirety of the composition is not higher than 50%.

A sheet-form insulating varnish according to the present disclosure is a sheet-form insulating varnish formed from the thermosetting resin composition according to the present disclosure. The sheet-form insulating varnish is formed from the thermosetting resin composition in an uncured or semi-cured state, in a sheet form with a film thickness of 1 μm to 500 μm.

An electrical device according to the present disclosure is an electrical device including: a substrate on which an electronic part is mounted; and a housing to which the substrate is fixed. The sheet-form insulating varnish according to the present disclosure is disposed in a gap between the electronic part and the substrate or a gap between the substrate and the housing.

A rotary electric machine according to the present disclosure is a rotary electric machine in which a stator coil is accommodated in a slot of a stator core. The sheet-form insulating varnish according to the present disclosure is disposed in a gap between the stator coil and an inner wall of the slot.

A producing method for a sheet-form insulating varnish according to the present disclosure is a producing method for a sheet-form insulating varnish to be disposed in a gap between insulation target members, at least a part of the gap having a fixed dimension. The producing method includes: a first step of preparing a slurry of a thermosetting resin composition by stirring and mixing a thermosetting resin (A) that is in solid form at 25° C., a thermosetting resin (B) that is in liquid form at 25° C., a latent curing agent that is unreactive at 60° C. or lower, an inorganic filler having a maximum particle diameter smaller than the dimension of the gap and having an average particle diameter smaller than 0.5 times the dimension of the gap, and a diluent organic solvent; and a second step of applying the slurry on a release film or a release paper sheet such that the slurry has a film thickness that is 1.1 times to 2.0 times the dimension of the gap, and drying the slurry. In the thermosetting resin composition in the first step, 30 parts by mass to 70 parts by mass of the thermosetting resin (A) is contained per a total of 100 parts by mass of the thermosetting resin (A) and the thermosetting resin (B), and a volume ratio of the inorganic filler to an entirety of the composition is not higher than 50%.

The thermosetting resin composition according to the present disclosure allows production of a sheet-form insulating varnish that can assuredly fill the gap between the insulation target members and can insulate and fix both members since the sheet-form insulating varnish is compressed into a predetermined thickness by pressure application at normal temperature and is caused to flow by heating at the time of curing to permeate a narrow space between the members.

The sheet-form insulating varnish according to the present disclosure can assuredly fill the gap between the insulation target members and can insulate and fix both members since the sheet-form insulating varnish is compressed into a predetermined thickness by pressure application at normal temperature and is caused to flow by heating at the time of curing to permeate a narrow space between the members.

In the electrical device according to the present disclosure, the sheet-form insulating varnish according to the present disclosure is disposed in the gap between the electronic part and the substrate or the gap between the substrate and the housing. Thus, the insulation reliability, the thermal dissipation property, and the vibration resistance are improved, and size reduction and output increase of the electrical device are realized.

In the rotary electric machine according to the present disclosure, the sheet-form insulating varnish according to the present disclosure is disposed in the gap between the stator coil and the inner wall of the slot. Thus, the insulation reliability, the thermal dissipation property, and the vibration resistance are improved, and size reduction and output increase of the rotary electric machine are realized.

The producing method for a sheet-form insulating varnish according to the present disclosure allows production of a sheet-form insulating varnish that can assuredly fill the gap between the insulation target members and can insulate and fix both members.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
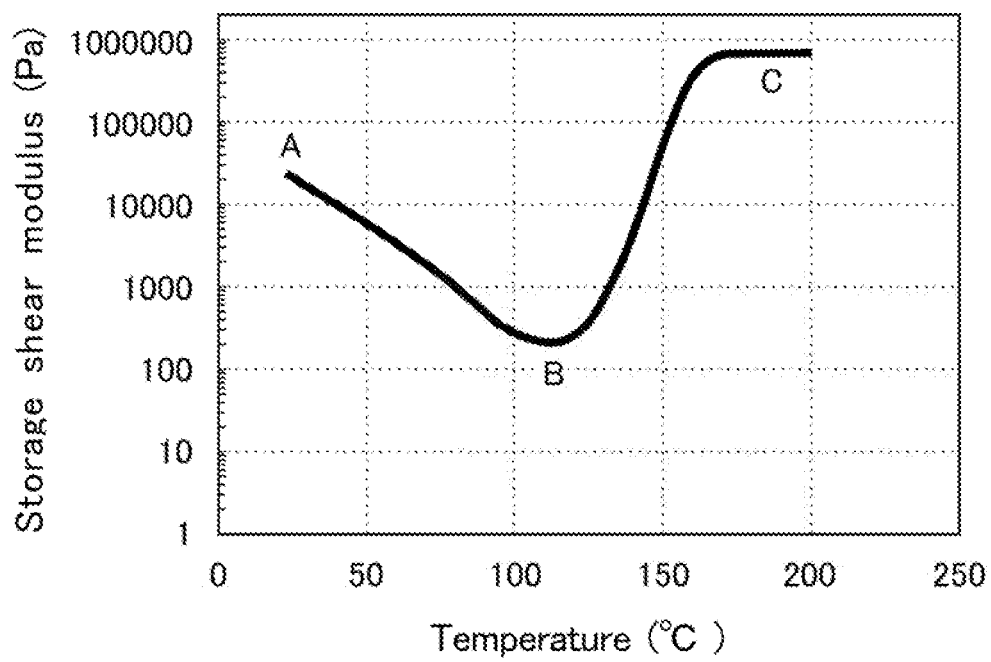
FIG. 1 is a graph for explaining a change, according to temperature change, in the storage shear modulus of a sheet-form insulating varnish according to a second embodiment.

Hereinafter, a thermosetting resin composition according to a first embodiment will be described. The thermosetting resin composition according to the first embodiment is a resin composition for a sheet-form insulating varnish to be disposed in a gap between insulation target members. At least a part of the gap between the members has a substantially fixed dimension (hereinafter, this is referred to as "the dimension of the gap"). In the following description, if a thermosetting resin (A) and a thermosetting resin (B) are not particularly distinguished from each other and both resins are meant or if a mixture resin of these resins is meant, the resins or the mixture resin is written simply as "thermosetting resin". Normal temperature means about 25° C.

The thermosetting resin composition contains: a thermosetting resin (A) that is in solid form at 25° C.; a thermosetting resin (B) that is in liquid form at 25° C.; a latent curing agent that is unreactive at 60° C. or lower; and an inorganic filler having a maximum particle diameter smaller than the dimension of the gap and having an average particle diameter smaller than 0.5 times the dimension of the gap. 30 parts by mass to 70 parts by mass of the thermosetting resin (A) is contained per a total of 100 parts by mass of the thermosetting resin (A) and the thermosetting resin (B). The volume ratio of the inorganic filler to the entirety of the composition is not higher than 50%. As necessary, the thermosetting resin composition further contains a curing accelerator, a thermoplastic resin, a film formability imparting agent, a tackifier, an adhesiveness imparting agent, and the like.

A sheet-form insulating varnish produced from the thermosetting resin composition in which the above-described raw materials are combined, has such a flexibility as to be compressed into a predetermined thickness by pressure application at normal temperature, and has a characteristic of flowing by heating at the time of curing to permeate a narrow space between members. Therefore, the thermosetting resin composition according to the first embodiment is suitable for producing a sheet-form insulating varnish that assuredly fills the gap between insulation target members and that insulates and fixes both members.

As the thermosetting resin, a resin that is well known as an epoxy resin, a phenolic resin, an unsaturated polyester resin, a polyurethane resin, a diallyl phthalate resin, or a silicone resin, is used. In particular, at least one of an epoxy resin, a phenolic resin, and an unsaturated polyester resin such as a vinyl ester resin generally used as an insulating varnish, is preferably contained.

Specific examples of the thermosetting resin include bisphenol A type epoxy resins, bisphenol F type epoxy resins, bisphenol AD type epoxy resins, brominated bisphenol A type epoxy resins, brominated bisphenol F type epoxy resins, brominated bisphenol AD type epoxy resins, alicyclic epoxy resins, brominated alicyclic epoxy resins, phenol novolac type epoxy resins, cresol novolac type epoxy resins, brominated phenol novolac type epoxy resins, brominated cresol novolac type epoxy resins, hydrogenated bisphenol A type epoxy resins, triglycidyl isocyanate, hydantoin type epoxy resins, heterocyclic epoxy resins, biphenyl backbone-containing aralkyl type epoxy resins, dicyclopentadiene type epoxy resins, novolac type phenolic resins, resol type phenolic resins, epoxy (meth)acrylate resins (vinyl ester-based resins), urethane (meth)acrylate resins, polyether (meth)acrylate resins, and polyester (meth)acrylate resins. These resins may be used singly, or two or more of these resins may be used in a mixed manner.

The thermosetting resin (A) is in solid form at normal temperature, and the softening temperature, which is the melting point or the glass transition point, of the thermosetting resin (A) is not higher than 150° C. and further preferably not higher than 125° C. If the softening temperature is higher than 150° C., a polymerization reaction with the thermosetting resin (B) less readily progresses at the time of heating. Thus, the curing temperature needs to be higher than 200° C., and this induces degradation of the insulation target members. Therefore, a softening temperature higher than 150° C. is not preferable.

The thermosetting resin (A) has to be dissolved in at least either the liquid-form thermosetting resin (B) or a diluent organic solvent (hereinafter, referred to as "diluent"). If the thermosetting resin (A) is not dissolved, a state where the resin components are evenly dissolved is not obtained at the time of preparation of a slurry, whereby a homogeneous sheet-form insulating varnish cannot be produced.

In a case where the thermosetting resin (A) is an epoxy resin, an epoxy resin having an epoxy equivalent not less than 200 and a softening point of 50° C. to 160° C. is more preferable from the viewpoint of increasing the force of adhesion with the insulation target members. Also in a case where the thermosetting resin (A) is an unsaturated polyester resin such as a vinyl ester resin, an unsaturated polyester resin having a softening point of 50° C. to 160° C. is preferable. These resins are excellent in workability at the time of premixing with other raw materials at normal temperature and easily melt by heating, thereby having improved capability of being evenly mixed with the other raw materials.

In the case where the thermosetting resin (A) is an epoxy resin, the thermosetting resin (B) is preferably an epoxy resin that is in liquid form at normal temperature in order to increase force of adhesion with the insulation target members, and a bisphenol A type epoxy resin and a bisphenol F type epoxy resin are more preferably used in order to increase the solubility of the thermosetting resin (A). In the case where the thermosetting resin (A) is an unsaturated polyester resin, the thermosetting resin (B) is preferably a low-molecular-weight body that has a low viscosity and that is an oligomer or a monomer of an unsaturated polyester resin, in order to increase the solubility of the curable resin (A).

In this manner, the thermosetting resin (A) and the thermosetting resin (B) that are in different forms at normal temperature are used, and blending conditions thereof such as the mass ratio therebetween are adjusted, thereby being able to control the surface tack (tackiness), the mechanical strength (toughness), and the adhesiveness at normal temperature, the fluidity at the time of heating, and the like, of the sheet-form insulating varnish formed from the thermosetting resin composition. 20 parts by mass to 80 parts by mass, and more preferably 30 parts by mass to 70 parts by mass, of the thermosetting resin (A) is contained per a total of 100 parts by mass of the thermosetting resin (A) and the thermosetting resin (B).

Regarding the mass ratio, the mass ratio of the thermosetting resin (A) to the thermosetting resin (B) (A/B) is preferably in a range of 20/80 to 80/20. If the mass ratio (A/B) is lower than 20/80, the amount of the liquid-form resin is large, and thus a stable sheet state is not obtained after drying, whereby separation from a release base material cannot be performed. If the mass ratio (A/B) is higher than 80/20, the amount of the solid-form resin is large, and thus toughness of the sheet (the tenacity of the material) decreases. Accordingly, a crack and a chip are easily generated at the time of drying or at the time of separation from the release base material, whereby workability becomes poor.

In order to produce a stable sheet having high toughness, the mass ratio (A/B) is preferably in a range of 30/70 to 70/30. In order to ensure an adhesiveness that enables easy adhesion to the insulation target members, the mass ratio (A/B) is preferably in a range of 30/70 to 50/50. Meanwhile, in a case where the surface of the sheet does not need to have adhesiveness (for example, in a case where adhesiveness causes workability to become poor), the mass ratio (A/B) is preferably in a range of 50/50 to 70/30 in order to reduce the surface tack.

The thermosetting resin composition may contain a curing agent for curing the thermosetting resin. The curing agent is not particularly limited, and a well-known curing agent can be selected as appropriate according to the type of the thermosetting resin. As the curing agent, an amine, a phenol, an acid anhydride, an imidazole, a polymercaptan curing agent, a polyamide resin, or the like is used.

Specific examples of the curing agent include: alicyclic acid anhydrides such as methyltetrahydrophthalic anhydride, methylhexahydrophthalic anhydride, and himic anhydride; aliphatic acid anhydrides such as dodecenyl succinic anhydride; aromatic acid anhydrides such as phthalic anhydride and trimellitic anhydride; dicyandiamide; aromatic diamines such as 4,4'-diaminodiphenylsulfone; organic dihydrazides such as adipic acid dihydrazide; boron halide amine complexes such as boron trifluoride, boron trichloride, and boron tribromide; tris(dimethylaminomethyl)phenol; dimethylbenzylamine; 1,8-diazabicyclo(5,4,0)undecene and derivatives thereof; imidazoles such as 2-methylimidazole, 2-ethyl-4-methylimidazole, 2-phenylimidazole, and 1-cyanoethyl-2-methylimidazole; polyhydric phenol compounds such as bisphenol A, bisphenol F, bisphenol S, a phenol novolac resin, a cresol novolac resin, and a p-hydroxystyrene resin; and organic peroxides.

Representative specific examples of the boron halide amine complexes include boron trifluoride monoethylamine complexes, boron trifluoride diethylamine complexes, boron trifluoride isopropylamine complexes, boron trifluoride chlorophenylamine complexes, boron trifluoride-triallylamine complexes, boron trifluoride benzylamine complexes, boron trifluoride aniline complexes, boron trichloride monoethylamine complexes, boron trichloride phenol complexes, boron trichloride piperidine complexes, boron trichloride dimethyl sulfide complexes, boron trichloride-N,N-dimethyloctylamine complexes, boron trichloride-N,N-dimethyldodecylamine complexes, and boron trichloride-N,N-diethyldioctylamine complexes. These curing agents may be used singly, or two or more of these curing agents may be used in combination.

The amount of the curing agent to be blended may be adjusted as appropriate according to the types of the thermosetting resin and the curing agent to be used. Ordinarily, the amount per 100 parts by mass of the thermosetting resin is preferably not less than 0.1 parts by mass and not greater than 200 parts by mass.

In the case where an epoxy resin is used as the thermosetting resin, the curing agent is preferably a latent curing agent that is unreactive at 60° C. or lower, from the viewpoint of the preservation stability, the curability, the cured resin physical property of the sheet-form insulating varnish, and the like. Specific examples of the latent curing agent include: boron halide amine complexes such as a boron trifluoride-amine complex; dicyandiamide; organic acid hydrazides; and aromatic diamines such as 4,4'-diaminodiphenylsulfone. These latent curing agents may be used singly, or two or more of these latent curing agents may be used in combination. Regarding the amount of the latent curing agent to be blended, the equivalent ratio of the latent curing agent to the epoxy resin which is the thermosetting resin is 0.3 to 2.0, and, from the viewpoint of stability of cured product property, is preferably 0.5 to 1.5.

The organic peroxide is used as a reaction initiator for initiating a polymerization reaction. The organic peroxide is not particularly limited and an organic peroxide well known in the technical field can be used, as long as the 10-hour half-life temperature thereof is not lower than 40° C. Specific examples of the organic peroxide include peroxides such as ketone peroxides, peroxyketals, hydroperoxides, dialkyl peroxides, diacyl peroxides, peroxyesters, and peroxydicarbonates. These organic peroxides may be used singly, or two or more of these organic peroxides may be used in a mixed manner.

If an organic peroxide having high active temperature is selected, the usable time of the sheet-form insulating varnish can be lengthened. The 10-hour half-life temperature of the organic peroxide is preferably not lower than 80° C. from the viewpoint of ensuring a usable time of a sheet-form insulating varnish suitable for impregnation of a coil. Meanwhile, the 10-hour half-life temperature of the organic peroxide is preferably not higher than the setting temperature of a curing oven at the time of curing the sheet-form insulating varnish, in order to cause curing of the sheet-form insulating varnish to efficiently progress.

Specific examples of the organic peroxide having such a 10-hour half-life temperature include 1,1-di(t-butylperoxy) cyclohexane, 1,1-di(t-hexylperoxy)cyclohexane, 1,1-di(t-hexylperoxy)-3,3,5-trimethylcyclohexane, 1,1-di(t-butylperoxy)-2-methylcyclohexane, 2,2-di(4,4-di-(butylperoxy)cyclohexyl)propane, n-butyl-4,4-di-(t-butylperoxy)valerate, 2,2-di-(t-butylperoxy)butane, t-hexylperoxyisopropyl monocarbonate, t-butylperoxy maleic acid, t-butylperoxy-3,5,5-trimethyl hexanoic acid, t-butylperoxy lauric acid, t-butylperoxyisopropyl monocarbonate, t-butylperoxy benzoate, t-butylperoxy acetate, t-hexylperoxy benzoate, 2,5-dimethyl-2,5-di(benzoylperoxy)hexane, t-butylperoxy-2-ethylhexyl monocarbonate, di(2-t-butylperoxyisopropyl) benzene, dicumyl peroxide, di-t-hexyl peroxide, 2,5-dimethyl-2,5-di(t-butylperoxy)hexane, di-t-hexyl peroxide, t-butylcumyl peroxide, di-t-butyl peroxide, 2,5-dimethyl-2,5-di(t-butylperoxy)hexyne-3, p-menthane hydroperoxide, t-butylperoxyallyl monocarbonate, methyl ethyl ketone peroxide, 1,1,3,3-tetramethylbutyl hydroperoxide, t-butyl hydroperoxide, cumin hydroperoxide, and diisopropylbenzene hydroperoxide. These organic peroxides may be used singly, or two or more of these organic peroxides may be used in a mixed manner.

Although the amount of the organic peroxide to be blended is not particularly limited, the amount per a total of 100 parts by mass of a polyester resin which is the thermosetting resin is ordinarily 0.1 parts by mass to 10 parts by mass, and is more preferably 0.5 parts by mass to 5 parts by mass. If the amount of the blended organic peroxide is less than 0.1 parts by mass, the crosslink density becomes low, and curing may be insufficient. Meanwhile, if the amount of the blended organic peroxide is greater than 10 parts by mass, the usable time of the sheet-form insulating varnish tends to be significantly shortened.

In addition, the thermosetting resin composition may contain, as necessary, a curing accelerator. The curing accelerator is not particularly limited, and a well-known curing accelerator may be selected as appropriate according to the type of the thermosetting resin. Specific examples of the curing accelerator include tertiary amines, imidazoles, and amine adducts. A curing accelerator that is unreactive at 60° C. or lower is more preferable from the viewpoint of the preservation stability, the curability, the cured resin physical property of the sheet-form insulating varnish, and the like.

The amount of the curing accelerator to be blended per a total of 100 parts by mass of the thermosetting resin is ordinarily 0.01 parts by mass to 10 parts by mass and more preferably 0.02 parts by mass to 5.0 parts by mass. If the amount of the curing accelerator is less than 0.01 parts by mass, inferiority in the effect of promoting a curing reaction, results. Meanwhile, if the amount is greater than 10 parts by mass, the usable time tends to be shortened.

In addition, the thermosetting resin composition may contain, as necessary, a film formability imparting agent in order to improve film formabilities such as film thickness uniformity and surface smoothness. As the film formability imparting agent, a thermoplastic resin having a weight average molecular weight of 10,000 to 100,000 is used. The amount of the thermoplastic resin per a total of 100 parts by mass of the thermosetting resin (A) and the thermosetting resin (B) is 1 part by mass to 40 parts by mass. The thermoplastic resin is not particularly limited, and a well-known thermoplastic resin can be selected as appropriate according to the type of the thermosetting resin. Specific examples of the thermoplastic resin include phenoxy resins and saturated polyester resins. These film formability imparting agents may be used singly, or two or more of these film formability imparting agents may be used in combination.

If the weight average molecular weight of the thermoplastic resin is less than 10,000, the film formability is not improved. Meanwhile, if the weight average molecular weight is greater than 100,000, the solubility and the dispersibility into the liquid-form thermosetting resin (B) are poor, and a slurry cannot be prepared. From the viewpoint of curing promoting property, cured resin physical property, and the like, the amount of the film formability imparting agent to be blended per a total of 100 parts by mass of the thermosetting resin is ordinarily 1 part by mass to 40 parts by mass and more preferably 5 parts by mass to 30 parts by mass. If the amount of the film formability imparting agent is less than 1 part by mass, inferiority in the effect of improving the film formability, results. Meanwhile, if the amount is greater than 40 parts by mass, the solubility and the dispersibility into the liquid-form thermosetting resin (B) are poor, and a slurry cannot be prepared.

In addition, the thermosetting resin composition may contain, as necessary, a tackifier in order to improve the surface tack of the sheet. The tackifier is not particularly limited and a well-known tackifier can be selected as appropriate according to the type of the thermosetting resin, as long as the weight average molecular weight of the tackifier is 10,000 to 200,000. Specific examples of the tackifier include terpene-based resins, rosin-based resins, natural rubber, styrene-based elastomers, polyvinyl acetal-based resins, polyvinyl formal-based resins, and polyvinyl butyral-based resins. These tackifiers may be used singly, or two or more of these tackifiers may be used in combination.

If the weight average molecular weight of the tackifier is less than 10,000, the adhesiveness is not improved. Meanwhile, if the weight average molecular weight is greater than 200,000, the solubility and the dispersibility into the liquid-form thermosetting resin (B) are poor, and a slurry cannot be prepared. From the viewpoint of curing promoting property, cured resin physical property, and the like, the amount of the tackifier to be blended per a total of 100 parts by mass of the thermosetting resin is ordinarily 1 part by mass to 20 parts by mass and more preferably 2 parts by mass to 10 parts by mass. If the amount of the tackifier is less than 1 part by mass, inferiority in the effect of improving the surface tack, results. Meanwhile, if the amount is greater than 20 parts by mass, the solubility and the dispersibility into the liquid-form thermosetting resin (B) are poor, and a slurry cannot be prepared.

In addition, the thermosetting resin composition may contain an adhesiveness imparting agent from the viewpoint of improving the force of adhesion at an interface between the thermosetting resin and the inorganic filler or an interface between the sheet-form insulating varnish and an insulation target member. The adhesiveness imparting agent is not particularly limited, and a well-known adhesiveness imparting agent can be selected as appropriate according to the type of the thermosetting resin or the inorganic filler.

Specific examples of the adhesiveness imparting agent include silane coupling agents such as γ-glycidoxypropyltrimethoxysilane, N-β(aminoethyl)γ-aminopropyltriethoxysilane, N-phenyl-γ-aminopropyltrimethoxysilane, and γ-mercaptopropyltrimethoxysilane. These adhesiveness imparting agents may be used singly, or two or more of these adhesiveness imparting agents may be used in combination.

The amount of the adhesiveness imparting agent to be blended may be set as appropriate according to the type of the thermosetting resin or the adhesiveness imparting agent to be used, and the like. Ordinarily, the amount per 100 parts by mass of the thermosetting resin is preferably 0.01 parts by mass to 5 parts by mass.

In addition, the thermosetting resin composition may contain a filler from the viewpoint of improvement in thermal conductivity and mechanical strength, increase in the film thickness of the sheet-form insulating varnish, and the like. The filler is not particularly limited, and a well-known filler can be selected as appropriate according to the purpose. The filler may be a filler that is subjected to surface treatment with a silane-based coupling agent, a titanate-based coupling agent, or the like or that is not subjected to such surface treatment.

Specific examples of the inorganic filler include crystalline silica, fused silica, alumina, talc, clay, calcium carbonate, calcium silicate, titanium dioxide, silicon nitride, aluminum hydroxide, aluminum nitride, boron nitride, glass, barium sulfate, magnesia, beryllium oxide, mica, and magnesium oxide. Although the form of the filler is preferably a fractured form or a spherical form, the form may be a nearly spherical form, a scale form, a fibrous form, a milled fiber form, a whisker form, or the like. These fillers may be used singly, or two or more of these fillers may be used in a mixed manner.

The sheet-form insulating varnish formed from the thermosetting resin composition is disposed by adhesion, insertion, or the like in a gap between insulation target members. Therefore, an inorganic filler having a maximum particle diameter smaller than the dimension of the gap and having an average particle diameter smaller than 0.5 times the dimension of the gap, is selected. The volume ratio of the inorganic filler to the entirety of the composition is preferably not higher than 50%.

In addition, a resin-based filler such as a thermoplastic resin, a rubber component, or any of various oligomers may be added for the purpose of improving the crack resistance, the shock resistance, and the like of a resin cured product. Specific examples of the resin-based filler include butyral resins, polyvinyl acetal resins, polyamide resins, aromatic polyester resins, phenoxy resins, MBS resins (methylmethacrylate-butadiene-styrene copolymers), ABS resins (acrylonitrile-butadiene-styrene copolymers), and acrylic resins. The resin-based filler can be modified with silicone oil, silicone resin, silicone rubber, fluororubber, or the like. In addition, various plastic powders, various engineering plastic powders, and the like may be added.

The amount of the filler to be blended only has to be an amount that enables the resin composition to be evenly mixed. The amount per 100 parts by mass of the thermosetting resin is ordinarily not greater than 85 parts by mass and more preferably not greater than 50 parts by mass. If the amount of the filler is greater than 85 parts by mass, the filler cannot be evenly mixed with the resin, and the reproducibility of a property tends to fail to be obtained.

Furthermore, an anti-settling agent or a dispersant for inhibiting solid powders of the filler and the like from settling in the resin, an antifoaming agent for preventing generation of voids, a slidability improver or an anti-blocking agent such as polymer beads for preventing blocking between sheet-form insulating varnishes, a coating fixing agent, an antioxidant, a flame retardant, a colorant, a viscosity improver, a viscosity reducer, a surfactant, and the like may be blended in the thermosetting resin composition. The thermosetting resin composition according to the first embodiment allows production of a sheet-form insulating varnish that assuredly fills a gap, and also a narrow space in the gap, between insulation target members and that insulates and fixes both members.

Second Embodiment

In a second embodiment, a producing method for a sheet-form insulating varnish using the above-described thermosetting resin composition according to the first embodiment, and the physical properties of the sheet-form insulating varnish, will be described. The sheet-form insulating varnish is formed from the above-described thermosetting resin composition according to the first embodiment in an uncured or semi-cured state, in a sheet form with a film thickness of 1 μm to 500 μm.

The producing method for the sheet-form insulating varnish includes: a first step of preparing a slurry of the thermosetting resin composition; and a second step of applying the slurry on a release film or a release paper sheet, and drying the slurry. In the first step, a diluent is added to the above-described thermosetting resin composition according to the first embodiment so as to obtain a predetermined mixture viscosity, and the mixture is stirred and mixed with a stirring machine until the filler is evenly dispersed without settling.

The slurry contains at least: the thermosetting resin (A) that is in solid form at 25° C.; the thermosetting resin (B) that is in liquid form at 25° C.; the latent curing agent that is unreactive at 60° C. or lower; the inorganic filler having a maximum particle diameter smaller than the dimension of the gap and having an average particle diameter smaller than 0.5 times the dimension of the gap; and the diluent. Blending thereof is performed such that 30 parts by mass to 70 parts by mass of the thermosetting resin (A) is contained per a total of 100 parts by mass of the thermosetting resins, and the volume ratio of the inorganic filler to the entirety of the composition is not higher than 50%.

The diluent for dissolving each thermosetting resin substantially completely disappears as a result of volatilization or evaporation after film coating. The diluent is not particularly limited, and a well-known diluent can be selected as appropriate according to the types of the thermosetting resin, the inorganic filler, and the like to be used. Specific examples of the diluent include toluene and methyl ethyl ketone. These solvents may be used singly, or two or more of these solvents may be used in combination. The amount of the solvent to be blended is not particularly limited as long as a mixture viscosity that enables kneading is obtained. The amount per a total of 100 parts by mass of the thermosetting resin and the inorganic filler is ordinarily 20 parts by mass to 200 parts by mass.

Next, in the second step, the slurry is applied on a release film or a release paper sheet by a sheet coating machine so as to have a film thickness that is 1.1 times to 2.0 times the dimension of the gap, and the slurry is dried in a drying oven, to produce a sheet-form insulating varnish. The coating method is not particularly limited, and a coating machine that is well known in the technical field may be used to apply the slurry. In the produced sheet-form insulating varnish, the thermosetting resin composition is in an uncured or semi-cured state. Thus, when such sheets come into contact with each other, adhesion (blocking) occurs therebetween. Therefore, a base material which is the release film or the release paper sheet is stacked on one surface, and the base material is separated at the time of use.

In the drying oven, the diluent is volatilized under a temperature condition of 80° C. to 160° C. The non-volatile content, after the drying, per a total of 100 parts by mass of the sheet-form insulating varnish is not less than 97 parts by mass and more preferably not less than 99 parts by mass. If the non-volatile content is less than 97 parts by mass, the remaining diluent makes it difficult to perform separation from the base material such as the release paper sheet or the release film. The sheet-form insulating varnish may be in an uncured state in which the diluent has been merely volatilized (A-stage state), or may be in a semi-cured state in which heating for causing a curing reaction to progress has been further performed after the volatilization of the diluent (B-stage state).

The sheet-form insulating varnish has, at 25° C., such a flexibility as not to generate any crack even if the sheet-form insulating varnish is bent by 180 degrees. If drying progresses by excessive heating, a curing reaction of the resins in addition to the volatilization of the diluent progresses, whereby the sheet-form insulating varnish comes to have no flexibility. In this case, the sheet-form insulating varnish does not have such a flexibility as to be fitted along the shape of the surface of a member. Thus, when the sheet-form insulating varnish is disposed in a gap between members, the sheet-form insulating varnish may suffer a crack, or may not be adhered and fixed to the members even after being cured by heating and may not function as a varnish.

If the sheet-form insulating varnish has an overly large film thickness, the internal stress thereof increases, and a crack may be generated at the time of bending by 180 degrees. The film thickness of the sheet-form insulating varnish is preferably 1 μm to 500 μm, and, in order to completely fill the gap, more preferably 5 μm to 300 μm. If the film thickness is smaller than 1 μm, it becomes difficult to obtain a sheet having no pinhole. Meanwhile, if the film thickness is larger than 500 μm, a crack is highly likely to be generated in a 180-degree bending test.

A predetermined film thickness of the sheet-form insulating varnish is not smaller than 1.1 times the dimension of the gap. The film thickness is ordinarily set to be 1.1 times to 2.0 times the dimension, and more preferably set to be 1.3 times to 1.7 times the dimension. Specifically, if the gap is 100 μm, the film thickness of the sheet-form insulating varnish is preferably 110 μm to 200 μm and more preferably 130 μm to 170 μm. If the film thickness is smaller than 110 μm, the varnish is not sufficiently packed in a narrow space in the gap. Meanwhile, if the film thickness is larger than 200 µm, deterioration of assimilability such as inability to fix the members to each other by means of fixing screws, occurs.

The film thickness of the sheet-form insulating varnish is reduced through compression by at least 10% under a pressure of 25 MPa at 25° C. If a tolerance on the dimension of the gap between the members is taken into consideration, the film thickness is more preferably reduced through compression by at least 20%. The non-volatile content of the sheet-form insulating varnish is not less than 97 parts by mass (%). Thus, if the sheet-form insulating varnish is completely cured, the volume thereof decreases by 3% to 10%. Therefore, the film thickness of the sheet-form insulating varnish to be disposed in the gap between the members needs to be larger than the dimension of the gap by at least 10%. In a case where the film thickness of the sheet-form insulating varnish is reduced through compression by only less than 10% under a pressure of 25 MPa at 25° C., even if the sheet-form insulating varnish has filled the gap at the time of disposition thereof, a minute gap may be formed by shrinkage due to curing.

In a case where the sheet-form insulating varnish is used in a state of being adhered to the members in advance, the sheet-form insulating varnish preferably has a surface tack (tackiness) at 25° C. Meanwhile, in a case where the workability becomes poor if the adhesion to the members is performed in advance, the sheet-form insulating varnish can be made so as to have no surface tack while having flexibility and film-thickness compressibility, with the aforementioned blending ratios, drying conditions, and the like. The criterion for judgement of no surface tack is that the sheet-form insulating varnish is not adhered to insulation target members even when being pressed against the members under a pressure of 2 MPa at 40° C. If the sheet-form insulating varnish is adhered under this condition, the surface tack may intensify and the workability may become poor, depending on the work environment temperature (25 to 35° C.)

The sheet-form insulating varnish has to have, at 25° C., such a flexibility as to be compressed, and has to flow at the time of heating to permeate a narrow space (for example, uneven shape or the like) between members. In order to obtain such properties, the dried state of the sheet-form insulating varnish is important. Determination that the sheet-form insulating varnish has such a flexibility, can be easily made if no crack is generated even when the sheet-form insulating varnish is bent by 180 degrees. As a method for more quantitatively determining these flexibility and fluidity properties, an elastic modulus evaluation by viscoelasticity measurement is performed.

As a specific example of the viscoelasticity measurement, a change, according to temperature change, in the storage shear modulus (G') of the sheet-form insulating varnish is indicated in FIG. 1. It is preferable that the storage shear modulus at 25° C. (indicated by "A" in FIG. 1) is $1.0 \times 10^3$ Pa to $5.0 \times 10^4$ Pa and decreases in accordance with temperature increase, and that the smallest value thereof (indicated by "B" in FIG. 1) is present at 80° C. to 150° C. and is 10 Pa to $2.0 \times 10^3$ Pa. A sheet-form insulating varnish in which the above-described values are not satisfied, does not allow a desired compression rate to be obtained at the time of pressure application, whereby permeability into the narrow space between the members is not obtained.

If the smallest value of the storage shear modulus is present at lower than 80° C., a reaction progresses while the sheet-form insulating varnish is left at normal temperature, whereby the flexibility easily decreases. Meanwhile, if the smallest value is present at not lower than 150° C., the heating temperature necessary for complete curing becomes high, whereby the base material may be degraded. From the viewpoint of ensuring releasability from the release film, maintaining the sheet form, and obtaining fluidity at heating temperature, it is more preferable that the storage shear modulus at 25° C. is $3.0 \times 10^3$ Pa to $3.0 \times 10^4$ Pa, and that the smallest value of the storage shear modulus at 80° C. to 150° C. is $1.0 \times 10^2$ Pa to $5.0 \times 10^2$ Pa and is not greater than one tenth of the value at 25° C. The storage shear modulus at not lower than 180° C. is saturated at not less than $1.0 \times 10^5$ Pa owing to influence of curing (indicated by "C" in FIG. 1).

Figure 2:
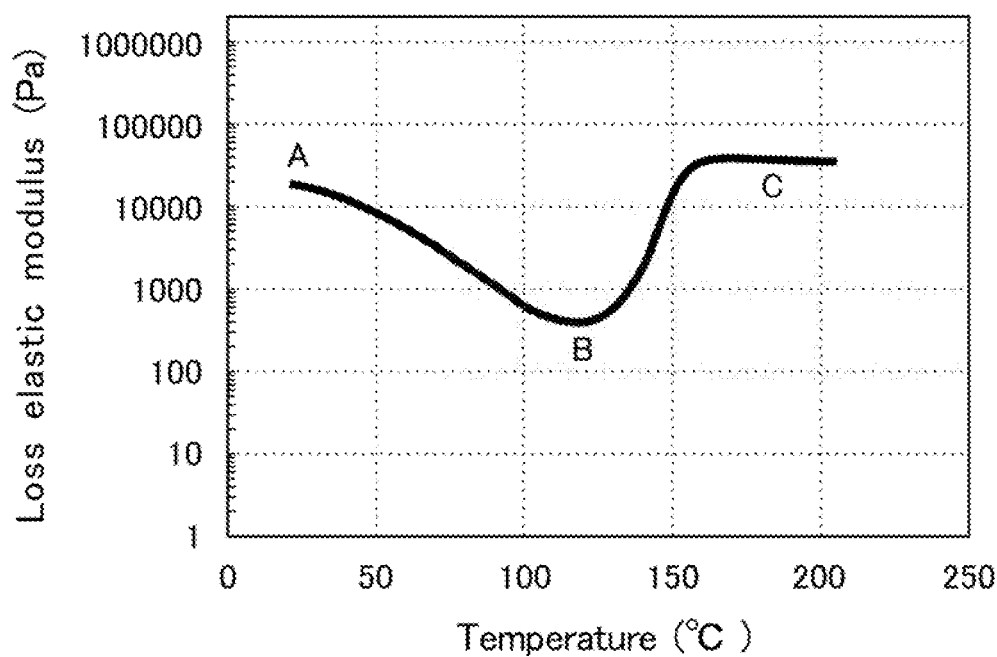
FIG. 2 is a graph for explaining a change, according to temperature change, in the loss elastic modulus of the sheet-form insulating varnish according to the second embodiment.

FIG. 2 indicates a change, according to temperature change, in the loss elastic modulus (G") of the sheet-form insulating varnish. It is preferable that the loss elastic modulus at 25° C. (indicated by "A" in FIG. 2) is $1.0 \times 10^2$ Pa to $5.0 \times 10^4$ Pa and decreases in accordance with temperature increase, and that the smallest value thereof (indicated by "B" in FIG. 2) is present at 80° C. to 150° C. and is 10 Pa to $2.0 \times 10^2$ Pa. In addition, it is preferable that the loss tangent (tan δ) is 0.3 to 3.5 at 25° C. and that the local maximum value of the loss tangent is present at 80° C. to 150° C. and is 1.0 to 3.5. A sheet-form insulating varnish in which the loss elastic modulus and the loss tangent do not satisfy the above-described values, does not allow a desired compression rate to be obtained at the time of pressure application, whereby permeability into the narrow space between the members is not obtained.

If the smallest value of the loss elastic modulus or the local maximum value of the loss tangent is present at lower than 80° C., a reaction progresses while the sheet-form insulating varnish is left at normal temperature, whereby the flexibility easily decreases. Meanwhile, if these values are present at not lower than 150° C., the heating temperature necessary for complete curing becomes high, whereby the base material may be degraded. From the viewpoint of ensuring releasability from the release film, maintaining the sheet form, and obtaining fluidity at heating temperature, it is more preferable that the loss elastic modulus at 25° C. is $3.0 \times 10^3$ Pa to $3.0 \times 10^4$ Pa and that the smallest value of the loss elastic modulus at 80° C. to 150° C. is $1.0 \times 10^2$ Pa to $1.0 \times 10^3$ Pa and is not greater than one fifth of the value at 25° C. The loss elastic modulus at not lower than 180° C. is saturated at not less than $5.0 \times 10^3$ Pa owing to influence of curing (indicated by "C" in FIG. 2), and the loss tangent is saturated at not greater than 0.2.

Figure 3:
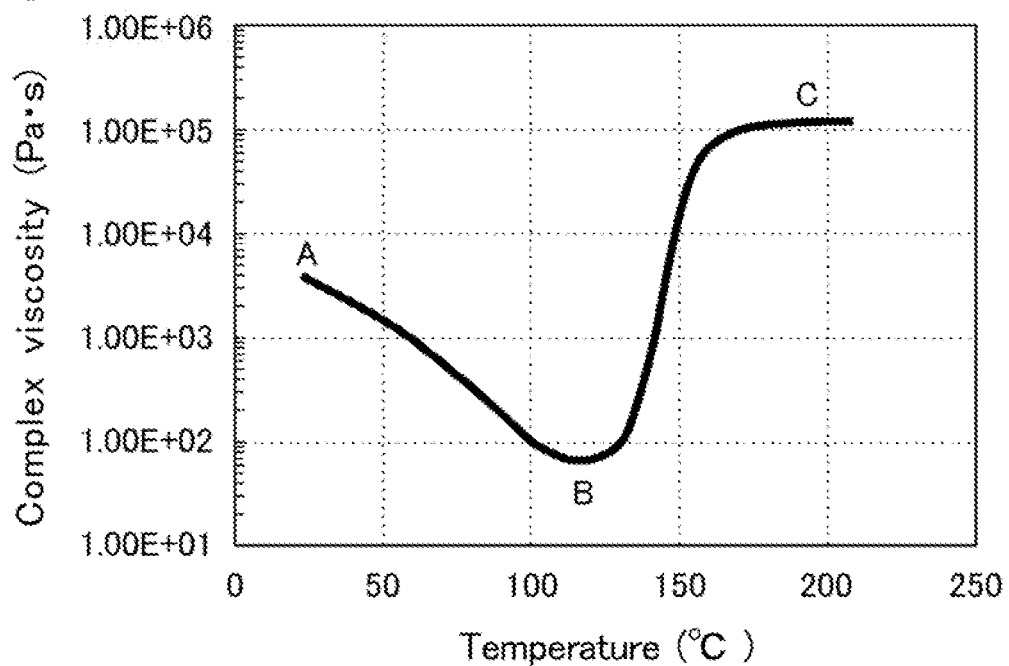
FIG. 3 is a graph for explaining a change, according to temperature change, in the complex viscosity of the sheet-form insulating varnish according to the second embodiment.

The flexibility and fluidity properties of the sheet-form insulating varnish can be evaluated based on complex viscosity. FIG. 3 indicates a change, according to temperature change, in the complex viscosity of the sheet-form insulating varnish obtained by dynamic viscoelasticity measurement. It is preferable that the complex viscosity at 25° C. (indicated by "A" in FIG. 3) is $6.0 \times 10^2$ Pa·s to $1.0 \times 10^4$ Pa·s and decreases in accordance with temperature increase, and that the smallest value thereof (indicated by "B" in FIG. 3) is present at 80° C. to 150° C. and is not greater than $5.0 \times 10^2$ Pa·s.

A sheet-form insulating varnish in which these values are not satisfied, does not allow a desired compression rate to be obtained at the time of pressure application, whereby permeability into the narrow space between the members is not obtained. Furthermore, from the viewpoint of ensuring releasability from the release film, maintaining the sheet form, and obtaining fluidity at heating temperature, it is more preferable that the complex viscosity at 25° C. is $1.0 \times 10^3$ Pa·s to $5.0 \times 10^3$ Pa·s and that the smallest value of the complex viscosity at 80° C. to 150° C. is 1 Pa·s to $5.0 \times 10^2$ Pas and is not greater than one tenth of the value at 25° C. The complex viscosity at not lower than 180° C. is saturated at not less than $1.0 \times 10^4$ Pas owing to influence of curing (indicated by "C" in FIG. 3).

The sheet-form insulating varnish is heated and cured in a curing treatment step after being disposed in a gap between insulation target members. Specifically, the sheet-form insulating varnish is disposed in advance on one member (a heat-generating component, a substrate, a housing, a coil, an insulating paper sheet, an insulation film, a core, or the like) and pressed and fixed at the other member (the same as above). If the sheet-form insulating varnish has no surface tack, the sheet-form insulating varnish may be adhered by means of double-sided tape or the like to prevent the sheet-form insulating varnish from falling off.

Although the curing temperature in the curing treatment step varies according to the types of the curing agent and the curing accelerator, setting to a curing temperature and a time is performed such that the curing temperature and the time do not cause degradation of the insulation target members. Specifically, the heating temperature is preferably 100° C. to 200° C. and more preferably 130° C. to 190° C. The heating time is preferably 1 minute to 6 hours and more preferably 3 minutes to 2 hours.

If the heating temperature is lower than 100° C. or the heating time is shorter than 1 minute, curing is insufficiently performed, and adhesion and fixation to the members cannot be performed. At a relatively low temperature of 100° C. to 170° C., the members are less likely to be degraded even if 6 hours are exceeded. However, if 6 hours are exceeded at not lower than 170° C. or heating to a high temperature not lower than 200° C. is performed, the members may be degraded. Since the sheet-form insulating varnish hardly contains a solvent, the sheet-form insulating varnish can be cured also by induction heating, electric conduction heating, or the like, whereby the curing treatment step is simplified.

In order to integrate the insulation target members with each other and improve vibration resistance, the force of adhesion, with the members after curing, of the sheet-form insulating varnish is preferably not less than 10 N/m. In order to suppress variation in vibration resistance property, the force of adhesion is more preferably not less than 20 N/m.

As an index of the adhesion strength, the shearing adhesion strength can be evaluated with a tensile testing machine using an adhesion test piece of the sheet-form insulating varnish. The adhesion test piece is produced as follows. A sheet-form insulating varnish having been cut out so as to have a size of 12.5 mm×25 mm is held between two rolled steel plates (width 25 mm×length 100 mm×thickness 1.6 mm) subjected to surface treatment of acetone degreasing, is fixed by means of a clip, and is cured under a condition of 150° C. and 1 hour. The shearing adhesion strength measured at a displacement rate of 1 mm/min in a test environment of 25° C. by using the tensile testing machine, is preferably not less than 5 MPa, and, in order to stably obtain vibration resistance, is more preferably not less than 10 MPa. At a shearing adhesion strength less than 5 MPa, sufficient vibration resistance is not obtained, and the long-term reliability of the device deteriorates.

The sheet-form insulating varnish according to the second embodiment can assuredly fill a gap between insulation target members and can insulate and fix both members since the sheet-form insulating varnish is efficiently compressed into a predetermined thickness by pressure application at normal temperature and is caused to flow by heating at the time of curing to permeate a narrow space between the members.

Third Embodiment

In a third embodiment, a usage example of the above-described sheet-form insulating varnish according to the second embodiment in a power source device will be described with reference to FIG. 4. Although a power source device is used as an example in the third embodiment, the usage is not limited thereto, and the sheet-form insulating varnish is applicable to general electrical devices including electronic devices. As the power source device, for example, a switching type DC-DC converter, a switching type AC-DC converter, or the like may be used.

Figure 4:
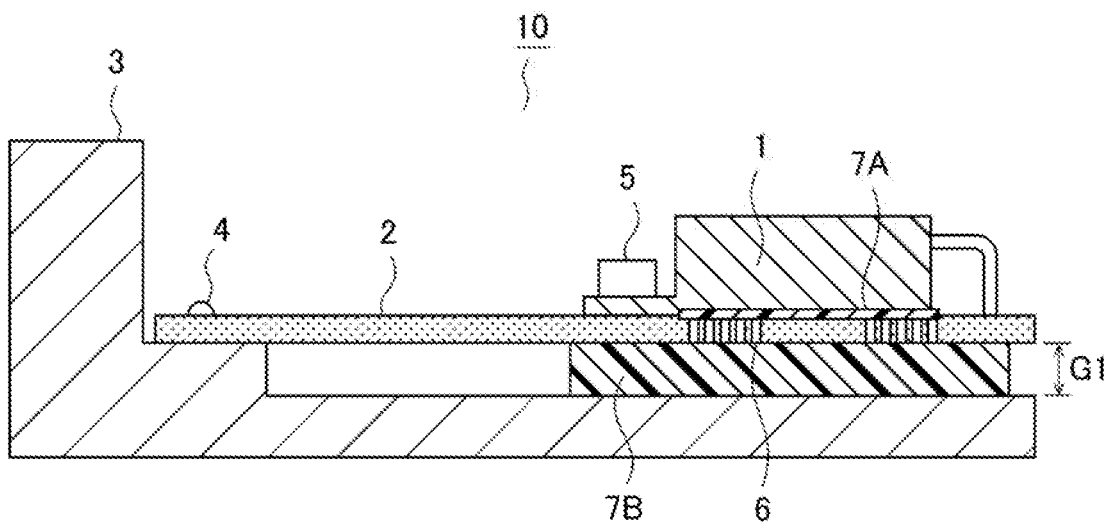
FIG. 4 is a diagram for explaining a usage example of the sheet-form insulating varnish in a power source device according to a third embodiment.

A power source device 10 shown in FIG. 4 includes: a substrate 2 on which an electronic part 1 is mounted; and a housing 3 to which the substrate 2 is fixed. The electronic part 1 includes heat-generating components such as a MOSFET (Metal Oxide Semiconductor Field Effect Transistor) which is a field effect transistor, a diode, a capacitor, and the like. The substrate 2 is fixed to the housing 3 by means of a substrate fixing screw 4, and the electronic part 1 is fixed to the substrate 2 by means of a fixing screw 5.

A packing though-hole 6 is formed in the substrate 2, a sheet-form insulating varnish 7A is disposed in a gap between the electronic part 1 and the substrate 2, and a sheet-form insulating varnish 7B is disposed in a gap between the substrate 2 and the housing 3. That is, in the case of the power source device 10, the gaps between the members in which the sheet-form insulating varnishes 7A and 7B are disposed, are the gap between the electronic part 1 (heat-generating component) and the substrate 2, and the gap between the substrate 2 and the housing 3.

In the case where the gap between the substrate 2 and the housing 3 is insulated, the sheet-form insulating varnish 7B having a film thickness 1.2 times the dimension of the gap (indicated by "G1" in FIG. 4) is adhered on the housing 3 side, and then the substrate 2 is fixed to the housing 3 by means of the substrate fixing screw 4, and the sheet-form insulating varnish 7B is heated and cured at 130° C. to 200° C. By this curing treatment, the substrate 2 and the housing 3 are insulated by the sheet-form insulating varnish 7B, and the substrate 2 is fixed to the housing 3. The sheet-form insulating varnish 7B before being cured preferably has surface tack in terms of workability.

Each of the sheet-form insulating varnishes 7A and 7B has, at 25° C., such a flexibility as to be compressed before the curing treatment, and is produced so as to flow at the time of heating to permeate a narrow space between the members. Specifically, each of the sheet-form insulating varnishes 7A and 7B has such a flexibility as not to be cracked even if being bent by 180 degrees and has a storage shear modulus, a loss elastic modulus, a loss tangent, and a complex viscosity that are set to be in the predetermined ranges (see the above-described second embodiment). Thus, each of the sheet-form insulating varnishes 7A and 7B has permeability into the narrow space between the members.

Therefore, the sheet-form insulating varnishes 7A and 7B permeate, by heating at the time of the curing treatment, the narrow space in the gap between the electronic part 1 and the substrate 2 and the narrow space in gap between the substrate 2 and the housing 3, respectively. Thus, the sheet-form insulating varnishes 7A and 7B can eliminate air spaces and assuredly fill the gaps. Accordingly, in the power source device 10 in which the sheet-form insulating varnishes 7A and 7B are used, insulation deterioration is less likely to occur, and heat generated from the electronic part 1 during operation is efficiently dissipated to the substrate 2. In addition, since the sheet-form insulating varnishes 7A and 7B do not contain solvents, the sheet-form insulating varnishes 7A and 7B can be cured not only in a general-purpose heating oven but also by induction heating and electric conduction heating. Furthermore, since less energy is lost during the curing treatment step, the curing time is shortened, and the process for producing the power source device is simplified.

Meanwhile, if a liquid insulating material such as an insulation coating agent or a potting agent is used, the insulating material flows in the gap between the members, and thus it is difficult to assuredly fill the gap. In addition, since the liquid insulating material contains a solvent, a large amount of an organic component is volatilized during the curing treatment step after the liquid insulating material is applied, whereby a problem arises in terms of sanitation and odor. In addition, since not only a resin curing reaction but also volatilization of an organic component not related to the curing reaction progresses during the curing treatment step, more energy is lost in the heating oven, and the curing time is lengthened. As a result, the amount of $CO_2$ emission increases, whereby a problem arises in terms of the environment.

According to the third embodiment, the sheet-form insulating varnishes 7A and 7B are disposed in the gap between the electronic part 1 and the substrate 2 and the gap between the substrate 2 and the housing 3, respectively. Thus, the insulation reliability, the thermal dissipation property, and the vibration resistance are improved, and size reduction and output increase of the power source device 10 are realized.

Fourth Embodiment

Figure 5:
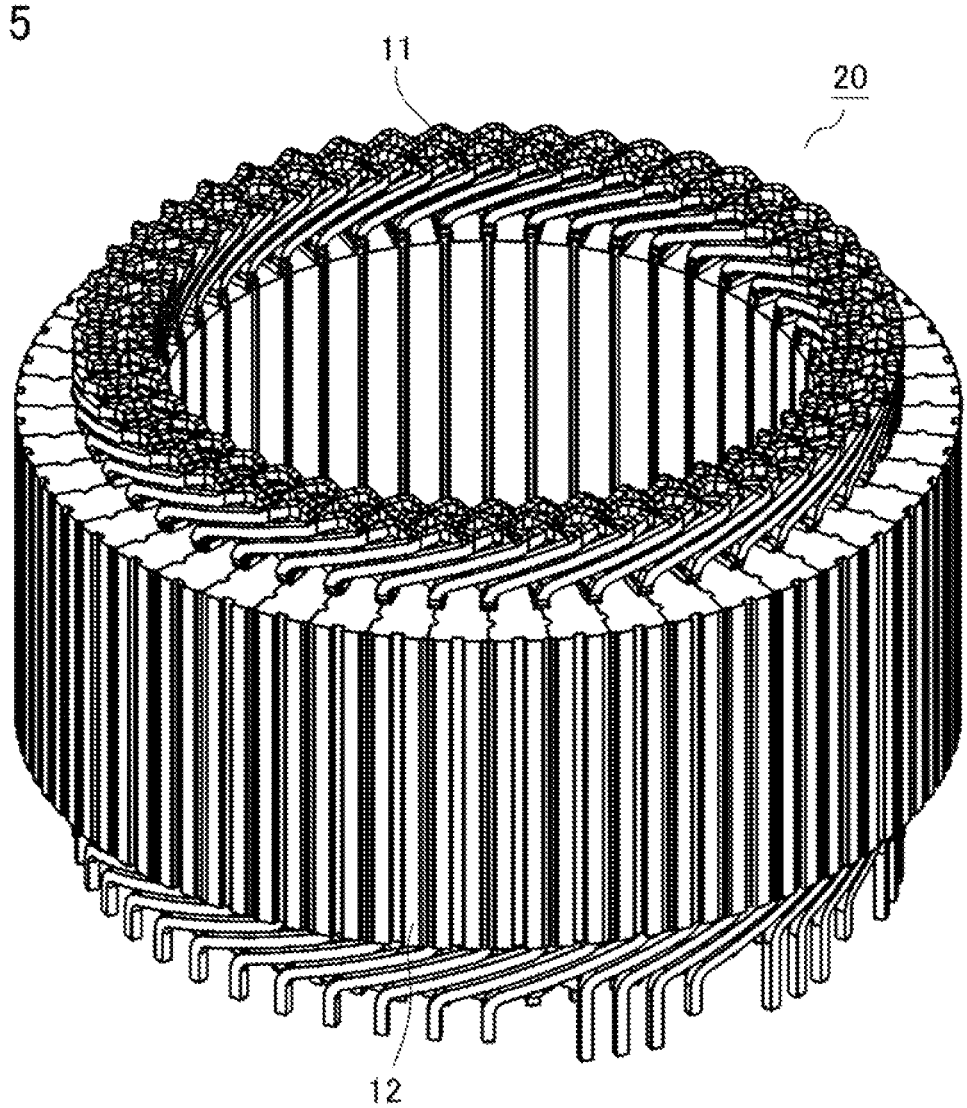
FIG. 5 is a perspective view of a stator of a rotary electric machine according to a fourth embodiment.
Figure 6:
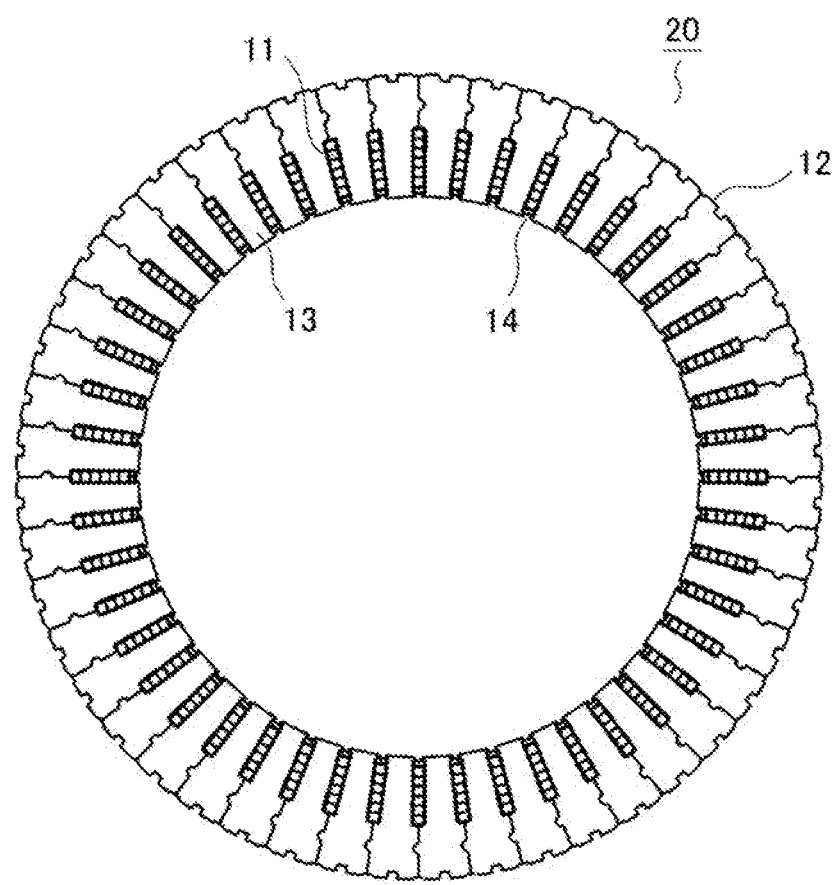
FIG. 6 is a sectional view of the stator of the rotary electric machine according to the fourth embodiment.

In a fourth embodiment, a usage example of the above-described sheet-form insulating varnish according to the second embodiment in a rotary electric machine will be described with reference to FIG. 5 to FIG. 9. As shown in FIG. 5 and FIG. 6, a rotary electric machine such as an electric motor, a power generator, or a compressor includes: stator coils 11; and a stator 20 including an annular stator core 12. A predetermined number of slots 14 are formed in the circumferential direction between teeth 13 of the stator core 12, and the stator coils 11 are accommodated in the slots 14.

Figure 7:
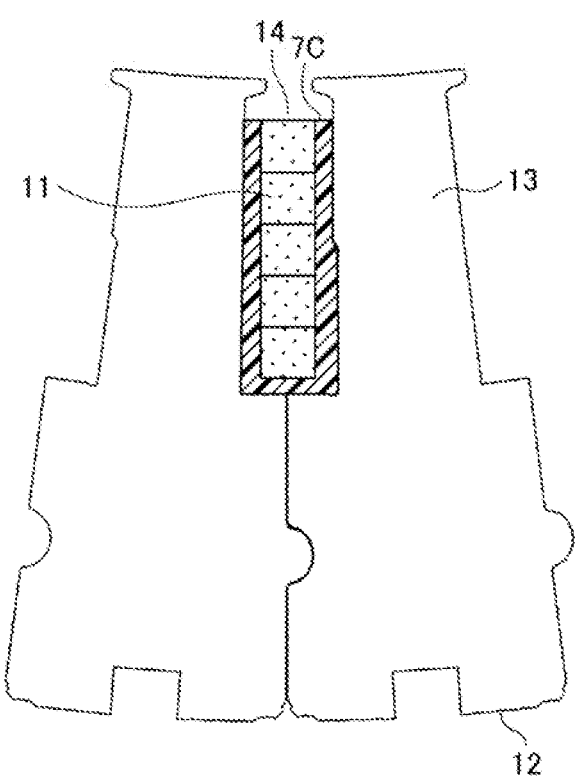
FIG. 7 is a diagram for explaining a usage example of the sheet-form insulating varnish in the stator of the rotary electric machine according to the fourth embodiment.
Figure 8:
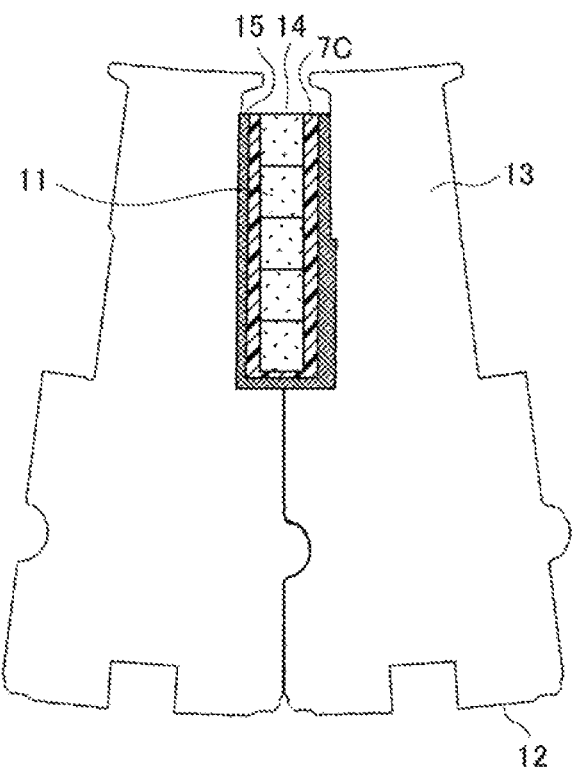
FIG. 8 is a diagram for explaining a usage example of the sheet-form insulating varnish in the stator of the rotary electric machine according to the fourth embodiment.
Figure 9:
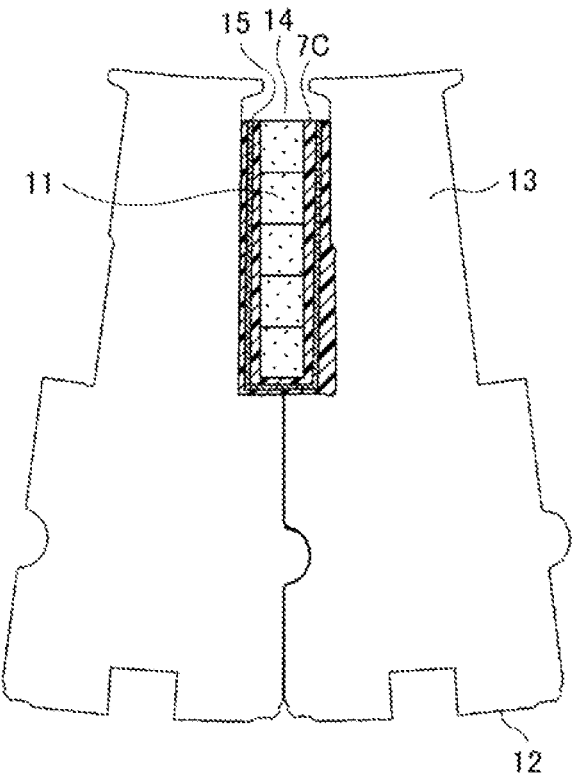
FIG. 9 is a diagram for explaining a usage example of the sheet-form insulating varnish in the stator of the rotary electric machine according to the fourth embodiment.

As shown in FIG. 7, a sheet-form insulating varnish 7C is disposed in a gap between the stator core 12 (the inner wall of each slot 14) and the corresponding stator coil 11. An insulating paper sheet 15 or an insulation film may be disposed in the gap between the inner wall of the slot 14 and the stator coil 11. In the example shown in FIG. 8, the sheet-form insulating varnish 7C is disposed on a surface, of the insulating paper sheet 15, that faces the coil. In the example shown in FIG. 9, the sheet-form insulating varnish 7C is disposed on each side of the insulating paper sheet 15. That is, in the case of the rotary electric machine, the gap between the insulation target members is the gap between the stator core 12 and the stator coil 11, the gap between the insulating paper sheet 15 and the stator coil 11, or the gap between the stator core 12 and the insulating paper sheet 15. Insulation tape may be adhered to the stator coil 11.

In a case where the actually measured dimension, of the gap between the stator core 12 and the stator coil 11, which is inclusive of a tolerance is 30 μm to 150 μm in a slot 14 having no insulating paper sheet 15 disposed therein, a filler having a maximum particle diameter not larger than 30 μm and having an average particle diameter not larger than 15 μm is selected as the filler. Meanwhile, in a case where the actually measured dimension, of the gap, which is inclusive of a tolerance and from which the thickness of the insulating paper sheet 15 is subtracted is 10 μm to 100 μm in a slot 14 having the insulating paper sheet 15 disposed therein, a filler having a maximum particle diameter not larger than 10 μm and having an average particle diameter not larger than 5 μm is selected as the filler.

In a process for producing the rotary electric machine, the sheet-form insulating varnish 7C is disposed on the stator core 12 or the insulating paper sheet 15 and the stator coil 11 is disposed, and then the stator core 12 is formed into an annular shape, thereby compressing and fixing the sheet-form insulating varnish 7C. At this time, if the film thickness of the sheet-form insulating varnish 7C is overly large, a gap is generated between the slots 14 at the time of the forming, whereby the stator core 12 cannot be formed into an annular shape.

Since the film thickness of the sheet-form insulating varnish 7C is set to be larger than the dimension of the gap between the stator core 12 and the stator coil 11, the film thickness has to be reduced under a pressure applied when the stator core 12 is formed into an annular shape. If the film thickness is reduced through compression by only less than 10% under a pressure of 25 MPa at 25° C., a gap is generated between the slots 14 at the time of the forming, whereby the stator core 12 cannot be formed into an annular shape. Therefore, the film thickness of the sheet-form insulating varnish 7C is 1.1 times to 2.0 times the dimension of the gap between the stator core 12 and the stator coil 11 and more preferably 1.3 to 1.7 times the dimension. In addition, the film thickness is reduced through compression by at least 10% and more preferably at least 20%, under a pressure of 25 MPa at 25° C.

In addition, in the case of the stator 20 of the rotary electric machine, if a sheet-form insulating varnish having surface tack is adhered to the stator core 12 or the insulating paper sheet 15 in advance, workability at the time of inserting the stator coil 11 becomes poor. Therefore, a varnish having no surface tack at 25° C. while having flexibility and compressibility is selected as the sheet-form insulating varnish 7C.

The sheet-form insulating varnish 7C permeates, by heating at the time of the curing treatment, a narrow space in a gap in the stator coil 11, and a narrow space in the gap between the stator coil 11 and the stator core 12 or the insulating paper sheet 15. Thus, the sheet-form insulating varnish 7C can eliminate air spaces and assuredly fill the gaps. Accordingly, in the rotary electric machine in which the sheet-form insulating varnish 7C is used, insulation performance for the stator coil 11 is high, and insulation deterioration is less likely to occur. In addition, heat generated from windings of the stator coil 11 can be efficiently dissipated to the stator core 12.

Moreover, since the stator coil 11 can be assuredly fixed, mechanical strength is maintained, and NVH properties are improved. In addition, since the sheet-form insulating varnish 7C does not contain a solvent, the sheet-form insulating varnish 7C can be cured not only in a general-purpose heating oven but also by induction heating and electric conduction heating. Furthermore, since less energy is lost during the curing treatment step, the curing time is shortened, and the process for producing the rotary electric machine is simplified.

According to the fourth embodiment, the sheet-form insulating varnish 7C is disposed in the gap between the stator coil 11 and the stator core 12 or the insulating paper sheet 15, or the gap between the stator core 12 and the insulating paper sheet 15. Thus, the insulation reliability, the thermal dissipation property, and the vibration resistance are improved, and size reduction and output increase of the rotary electric machine are realized.

EXAMPLES

Hereinafter, the present disclosure will be described in detail by means of examples and comparative examples. However, the present disclosure is not limited thereto. In the examples and the comparative examples, the following materials were mixed according to the respective formulas indicated in Table 1 and Table 2, thereby preparing thermosetting resin compositions. A diluent was blended with each of the thermosetting resin compositions, the mixture was applied on a release film, and the diluent was volatilized by drying such that the non-volatile content became not lower than 99%, thereby producing a sheet-form insulating varnish.

<Solid-Form Thermosetting Resin (A)>

(1-1) Bisphenol A type epoxy resin (epoxy equivalent: 720, softening point: 90° C.)

(1-2) Bisphenol F type epoxy resin (epoxy equivalent: 4200, softening point: 135° C.)

(1-3) Phenol novolac type epoxy resin (epoxy equivalent: 190, softening point: 150° C.)

(1-4) Bisphenol A type vinyl ester resin (polymerization average molecular weight: 2000, softening point: 80° C.)

<Liquid-Form Thermosetting Resin (B)>

(2-1) Bisphenol A type epoxy resin (epoxy equivalent: 184)

(2-2) Bisphenol F type epoxy resin (epoxy equivalent: 165)

(2-3) Neopentylglycol dimethacrylate (polymerization average molecular weight: 240)

<Curing Agent>

(3-1) Boron trifluoride monoethylamine complex (reaction initiation temperature: 120° C.)

(3-2) Dicyandiamide (reaction initiation temperature: 160° C.)

(3-3) Propylene amine (reactive at normal temperature)

(3-4) 2,5-dimethyl-2,5-di(t-butylperoxy)hexane (10-hour half-life temperature: 117.9° C.)

(3-5) Cumyl peroxyneodecanoate (10-hour half-life temperature: 36.5° C.)

<Curing Accelerator>

(4-1) 1-cyanoethyl-2-methylimidazole (reaction initiation temperature: 100° C.)

(4-2) 1,8-diazabicyclo[5,4,0]undecene-7 (reaction initiation temperature: 100° C.)

<Thermoplastic Resin>

(5-1) Phenoxy resin (polymerization average molecular weight: 100 thousand)

(5-2) Polyester resin (polymerization average molecular weight: 50 thousand)

<Tackifier>

(6-1) Polyvinyl acetal resin (polymerization average molecular weight: 100 thousand)

<Inorganic Filler>

(7-1) Fused silica (maximum particle diameter: 7 μm, average particle diameter: 2 μm)

(7-2) Crystalline silica (maximum particle diameter: 550 μm, average particle diameter: 200 μm)

(7-3) Alumina (maximum particle diameter: 18 μm, average particle diameter: 5 μm)

(7-4) Calcium carbonate (maximum particle diameter: 10 μm, average particle diameter: 3 μm)

TABLE 1

| Raw material | Material | | Unit | Example 1 | 2 | 3 | 4 | 5 | 6 |
|---|---|---|---|---|---|---|---|---|---|
| Solid-form thermosetting resin | (1-1) | | Parts by mass | 55 | | | | 50 | 50 |
| | (1-2) | | Parts by mass | | 50 | | | | |
| | (1-3) | | Parts by mass | | | 40 | | | |
| | (1-4) | | Parts by mass | | | | 70 | | |
| Liquid-form thermosetting resin | (2-1) | | Parts by mass | 45 | | 60 | | 50 | 50 |
| | (2-2) | | Parts by mass | | 50 | | | | |
| | (2-3) | | Parts by mass | | | | 30 | | |
| Curing agent | (3-1) | | Parts by mass | 8 | | 9 | | 7 | 7 |
| | (3-2) | | Parts by mass | | 1 | | | | |
| | (3-3) | | Parts by mass | | | | | | |
| | (3-4) | | Parts by mass | | | | 2 | | |
| | (3-5) | | Parts by mass | | | | | | |

TABLE 1-continued

| Raw material | Material | Unit | Example 1 | 2 | 3 | 4 | 5 | 6 |
|---|---|---|---|---|---|---|---|---|
| Curing accelerator | (4-1) | Parts by mass | | | | | 0.1 | 0.1 |
| | (4-2) | Parts by mass | | 0.3 | | | | |
| Thermoplastic resin | (5-1) | Parts by mass | 20 | | 10 | | 20 | 20 |
| | (5-2) | Parts by mass | | 15 | | 20 | | |
| Tackifier | (6-1) | Parts by mass | | | | | | 3 |
| Inorganic filler | (7-1) | Parts by mass | 85 | | | 105 | | |
| | (7-2) | Parts by mass | | | | | | |
| | (7-3) | Parts by mass | | 75 | | | 115 | |
| | (7-4) | Parts by mass | | | 15 | | | 106 |
| Amount of blended inorganic filler | | Volume % | 25 | 15 | 5 | 30 | 20 | 25 |

TABLE 2

| Raw material | Material | Unit | Comparative example 1 | 2 | 3 | 4 | 5 | 6 |
|---|---|---|---|---|---|---|---|---|
| Solid-form thermosetting resin | (1-1) | Parts by mass | 55 | | 90 | 10 | 55 | |
| | (1-2) | Parts by mass | | | | | | 50 |
| | (1-3) | Parts by mass | | | | | | |
| | (1-4) | Parts by mass | | 70 | | | | |
| Liquid-form thermosetting resin | (2-1) | Parts by mass | 45 | | 10 | 90 | 45 | |
| | (2-2) | Parts by mass | | | | | | 50 |
| | (2-3) | Parts by mass | | 30 | | | | |
| Curing agent | (3-1) | Parts by mass | | | 7 | 7 | 8 | |
| | (3-2) | Parts by mass | | | | | | 1 |
| | (3-3) | Parts by mass | 3 | | | | | |
| | (3-4) | Parts by mass | | | | | | |
| | (3-5) | Parts by mass | | 1.3 | | | | |
| Curing accelerator | (4-1) | Parts by mass | | | 0.1 | 0.1 | | |
| | (4-2) | Parts by mass | | | | | | 0.3 |
| Thermoplastic resin | (5-1) | Parts by mass | 20 | | 20 | 20 | 20 | |
| | (5-2) | Parts by mass | | 20 | | | | 15 |
| Tackifier | (6-1) | Parts by mass | | | | | | |
| Inorganic filler | (7-1) | Parts by mass | 85 | 105 | | | | |
| | (7-2) | Parts by mass | | | | | 103 | |
| | (7-3) | Parts by mass | | | 115 | 115 | | 75 |
| | (7-4) | Parts by mass | | | | | | |

TABLE 2-continued

| | | Comparative example | | | | | |
|---|---|---|---|---|---|---|---|
| Raw material | Material Unit | 1 | 2 | 3 | 4 | 5 | 6 |
| Amount of blended inorganic filler | Volume % | 25 | 30 | 20 | 20 | 25 | 15 |

As indicated in Table 1, the sheet-form insulating varnishes of Examples 1-6 were produced according to the raw materials described in the above-described first and second embodiments and the formulas thereof. Meanwhile, as indicated in Table 2, the sheet-form insulating varnishes of Comparative examples 1-6 were produced not according to the raw materials described in the above-described first and second embodiments and the formulas thereof, and did not conform to the sheet-form insulating varnish according to the present disclosure.

The sheet-form insulating varnish of each of Examples 1-6 and Comparative examples 1-6 was evaluated for flexibility, compression rate, adhesiveness, releasability, gelation time, storage shear modulus, loss elastic modulus, loss tangent, complex viscosity, and minimum complex viscosity. In addition, a cured product of the sheet-form insulating varnish was evaluated for adhesion strength and dielectric voltage.

In order to ascertain the usable time of the sheet-form insulating varnish, the flexibility and the compression rate thereof were measured immediately after the production and after thirty days of preservation at 40° C. The flexibility was determined according to whether or not a crack or a chip was generated by bending the sheet-form insulating varnish by 180 degrees at 25° C. (○: not generated, x: generated). Regarding the compression rate, the sheet-form insulating varnish having a film thickness of 500 μm was disposed on a rolled steel plate, and the compression rate was calculated from reduction in the film thickness at the time of application of a pressure of 25 MPa at 25° C.

Regarding the adhesiveness, the sheet-form insulating varnish was disposed on a rolled steel plate, and evaluation based on whether or not the sheet-form insulating varnish was adhered by being pressed under a pressure of 2 MPa at 40° C., was performed immediately after the production and after thirty days of preservation at 40° C. Regarding the adhesiveness, there is a case where it is preferable to have adhesiveness and a case where it is preferable not to have adhesiveness, depending on the purpose of the sheet-form insulating varnish. Thus, it cannot be said that which case is better. However, it is not preferable that there is a difference between the adhesiveness immediately after the production and the adhesiveness after the elapse of thirty days. Therefore, evaluation was made in terms of this point.

Regarding the releasability, whether or not the sheet-form insulating varnish can be separated from the release film at 25° C. was determined immediately after the production and after thirty days of preservation at 40° C. (○: separated, x: not separated). Regarding the gelation time, the sheet-form insulating varnish was collected and the gelation time thereof at 150° C. was measured by a hot plate method.

Whether or not a crazing phenomenon would occur was checked in order to study influences on coatings of enamel wires. Each of enamel wires (φ 1.0 mm) coated with polyester imide/polyamide imide was elongated by 5% and then bent in a U shape, to produce a test piece. The sheet-form insulating varnish was adhered to the surface of the coating at normal temperature and was separated after 5 minutes. In the cases of each of sheet-form insulating varnishes having no adhesiveness (tackiness) and unable to be adhered, the sheet-form insulating varnish was brought into contact with the surface so as to be fixed by means of a clip. After the separation, evaluation based on whether or not a crazing phenomenon occurred was performed through observation with an optical microscope and a pinhole test.

The pinhole test was performed according to JIS C3003. Specifically, the test piece having a prescribed length (about 5 m) was immersed in a saline solution, and DC voltage of 12 V was applied for 1 minute with the solution serving as a positive electrode and the test piece serving as a negative electrode. The number of pinholes having been generated at this time was checked. Furthermore, each of test pieces having been cured under a condition of 150° C. and 1 hour after the adhesion was observed with an optical microscope to determine whether or not a crack or a pinhole was generated in the surface of the coating. As a result of the pinhole test and the observation, in cases where neither crack nor pinhole was generated and the dielectric breakdown voltage did not decrease, determination of "no crazing" was made, and meanwhile, in cases where generation of a crack or a pinhole was found and the dielectric breakdown voltage decreased, determination of "crazing occurred" was made (○: no crazing, x: crazing occurred).

Regarding the gelation time, the thermosetting resin composition of the sheet-form insulating varnish was collected, and the gelation time thereof at 150° C. was measured by a hot plate method. Regarding the softening point, the sheet formed from the thermosetting resin composition was collected, and the softening point thereof was measured according to "Test methods of coating powders for electrical insulation" of JIS C2161. The storage shear modulus, the loss elastic modulus, the loss tangent, the complex viscosity, and the minimum complex viscosity, were measured by evaluation of dynamic viscoelasticity when the temperature was increased from normal temperature at a temperature increase rate of 5° C./minute with a parallel plate jig by using each sheet-form insulating varnish having a film thickness of 100 μm to 300 μm.

Regarding the adhesion strength, adhesion test pieces were prepared, and evaluation was performed with a tensile testing machine. Each adhesion test piece was prepared as follows. A sheet-form insulating varnish having been cut out so as to have a size of 12.5 mm×25 mm was held between two rolled steel plates (width: 25 mm, length: 100 mm, thickness: 1.6 mm) subjected to surface treatment of acetone degreasing, was fixed by means of a clip, and was cured at 150° C. for 1 hour.

Regarding the dielectric voltage, each sheet-form insulating varnish was adhered on a steel plate piece side and cured at 150° C. for 1 hour, to prepare a test piece. Then, voltage was applied in oil to the test piece at a fixed voltage increase rate of 0.5 kV/second by using an insulation breakdown tester, whereby a dielectric breakdown voltage was measured and was evaluated according to the following determination criteria (○: dielectric breakdown voltage not less than 8 kV, x: dielectric breakdown voltage not greater than 8 kV).

The evaluation results about the sheet-form insulating varnishes of Examples 1-6 are indicated in Table 3, and the evaluation results about the sheet-form insulating varnishes of Comparative examples 1-6 are indicated in Table 4.

TABLE 3

| State | Property | Condition | Unit | Example 1 | Example 2 | Example 3 |
|---|---|---|---|---|---|---|
| Sheet-form insulating varnish | Flexibility | Immediately after production | — | ○ | ○ | ○ |
| | | After elapse of thirty days | — | ○ | ○ | ○ |
| | Compression rate | Immediately after production | % | 30 | 50 | 60 |
| | | After elapse of thirty days | % | 30 | 50 | 60 |
| | Adhesiveness | Immediately after production | — | Adhesive | Not adhesive | Not adhesive |
| | | After elapse of thirty days | — | Adhesive | Not adhesive | Not adhesive |
| | Releasability | Immediately after production | — | ○ | ○ | ○ |
| | | After elapse of thirty days | — | ○ | ○ | ○ |
| | Non-volatile content | — | % | 99.2 | 99.7 | 98.7 |
| | Crazing | Adhered to enamel wire | — | ○ | ○ | ○ |
| | Gelation time | 150° C. | Min. | 5 | 3 | 4 |
| | Storage shear modulus (G') | 25° C. | Pa | 7000 | 10000 | 5000 |
| | Minimum value of G' (temperature) | — | Pa | 230 (115° C.) | 274 (120° C.) | 193 (125° C.) |
| | Loss elastic modulus (G'') | 25° C. | Pa | 15000 | 9200 | 4500 |
| | Minimum value of G'' (temperature) | — | Pa | 360 (123° C.) | 290 (126° C.) | 225 (130° C.) |
| | Local maximum value of loss tangent (tanδ) | In range of 80° C. to 150° C. | — | 2.8 | 2.6 | 1.8 |
| | Complex viscosity | 25° C. | Pa · s | 2000 | 1500 | 850 |
| | Minimum complex viscosity (temperature) | — | Pa · s | 80 (118° C.) | 50 (125° C.) | 323 (128° C.) |
| Cured product | Adhesion strength | Rolled steel plate | MPa | 25 | 28 | 29 |
| | Dielectric voltage | 25° C. | kV | ○ | ○ | ○ |

| State | Property | Condition | Unit | Example 4 | Example 5 | Example 6 |
|---|---|---|---|---|---|---|
| Sheet-form insulating varnish | Flexibility | Immediately after production | — | ○ | ○ | ○ |
| | | After elapse of thirty days | — | ○ | ○ | ○ |
| | Compression rate | Immediately after production | % | 25 | 45 | 40 |
| | | After elapse of thirty days | % | 25 | 45 | 40 |

TABLE 3-continued

|  | | | | | | |
|---|---|---|---|---|---|---|
| | Adhesiveness | Immediately after production | — | Adhesive | Not adhesive | Adhesive |
| | | After elapse of thirty days | — | Adhesive | Not adhesive | Adhesive |
| | Releasability | Immediately after production | — | ○ | ○ | ○ |
| | | After elapse of thirty days | — | ○ | ○ | ○ |
| | Non-volatile content | — | % | 99.9 | 98.1 | 99.5 |
| | Crazing | Adhered to enamel wire | — | ○ | ○ | ○ |
| | Gelation time | 150° C. | Min. | 3 | 2 | 2 |
| | Storage shear modulus (G') | 25° C. | Pa | 6000 | 11000 | 13000 |
| | Minimum value of G' (temperature) | — | Pa | 325 (105° C.) | 473 (135° C.) | 146 (120° C.) |
| | Loss elastic modulus (G") | 25° C. | Pa | 5200 | 18500 | 20000 |
| | Minimum value of G" (temperature) | — | Pa | 471 (115° C.) | 608 (142° C.) | 199 (128° C.) |
| | Local maximum value of loss tangent (tanδ) | In range of 80° C. to 150° C. | — | 2.5 | 3.1 | 2.4 |
| | Complex viscosity | 25° C. | Pa·s | 5000 | 2300 | 2900 |
| | Minimum complex viscosity (temperature) | — | Pa·s | 260 (109° C.) | 70 (140° C.) | 90 (126° C.) |
| Cured product | Adhesion strength | Rolled steel plate | MPa | 24 | 30 | 30 |
| | Dielectric voltage | 25° C. | kV | ○ | ○ | ○ |

TABLE 4

| State | Property | Condition | Unit | Comparative example | | |
| | | | | 1 | 2 | 3 |
|---|---|---|---|---|---|---|
| Sheet-form insulating varnish | Flexibility | Immediately after production | — | ○ | ○ | x |
| | | After elapse of thirty days | — | x | x | x |
| | Compression rate | Immediately after production | % | 30 | 25 | 3 |
| | | After elapse of thirty days | % | 0 | 0 | 3 |
| | Adhesiveness | Immediately after production | — | Adhesive | Adhesive | Not adhesive |
| | | After elapse of thirty days | — | Not adhesive | Not adhesive | Not adhesive |
| | Releasability | Immediately after production | — | ○ | ○ | ○ |
| | | After elapse of thirty days | — | ○ | ○ | ○ |
| | Non-volatile content | — | % | 97.9 | 99.2 | 97.7 |
| | Crazing | Adhered to enamel wire | — | ○ | ○ | ○ |
| | Gelation time | 150° C. | Min. | 1 | 0.5 | 5 |
| | Storage shear modulus (G') | 25° C. | Pa | 8000 | 9800 | 90000 |

TABLE 4-continued

| State | Property | Condition | Unit | | | |
|---|---|---|---|---|---|---|
| | Minimum value of G' (temperature) | — | Pa | 90 (70° C.) | 9000 (35° C.) | 45000 (160° C.) |
| | Loss elastic modulus (G'') | 25° C. | Pa | 16000 | 10200 | 85000 |
| | Minimum value of G'' (temperature) | — | Pa | 103 (80° C.) | 9507 (38° C.) | 62300 (168° C.) |
| | Local maximum value of loss tangent (tanb) | In range of 80° C. to 150° C. | — | 1.9 | Absent | Absent |
| | Complex viscosity | 25° C. | Pa·s | 4500 | 12000 | 26000 |
| | Minimum complex viscosity (temperature) | — | Pa·s | 150 (74° C.) | 9200 (39° C.) | 3000 (166° C.) |
| Cured product | Adhesion strength | Rolled steel plate | MPa | 25 | 24 | 10 |
| | Dielectric voltage | 25° C. | kV | ○ | ○ | x |

| | | | | Comparative example | | |
|---|---|---|---|---|---|---|
| State | Property | Condition | Unit | 4 | 5 | 6 |
| Sheet-form insulating varnish | Flexibility | Immediately after production | — | ○ | x | ○ |
| | | After elapse of thirty days | — | ○ | x | ○ |
| | Compression rate | Immediately after production | % | 70 | 0 | 80 |
| | | After elapse of thirty days | % | 70 | 0 | 80 |
| | Adhesiveness | Immediately after production | — | Adhesive | Not adhesive | Adhesive |
| | | After elapse of thirty days | — | Adhesive | Not adhesive | Adhesive |
| | Releasability | Immediately after production | — | x | ○ | ○ |
| | | After elapse of thirty days | — | x | ○ | ○ |
| | Non-volatile content | — | % | 98.4 | 98.8 | 70.4 |
| | Crazing | Adhered to enamel wire | — | ○ | ○ | x |
| | Gelation time | 150° C. | Min. | 2 | 5 | 3.5 |
| | Storage shear modulus (G') | 25° C. | Pa | 300 | 120000 | 1000 |
| | Minimum value of G' (temperature) | — | Pa | 10 (65° C.) | 100000 (170° C.) | 15 (120° C.) |
| | Loss elastic modulus (G'') | 25° C. | Pa | 270 | 150000 | 900 |
| | Minimum value of G'' (temperature) | — | Pa | 50 (70° C.) | 12400 (178° C.) | 53 (128° C.) |
| | Local maximum value of loss tangent (tanδ) | In range of 80° C. to 150° C. | — | 4.1 (72° C.) | Absent | 3.9 |
| | Complex viscosity | 25° C. | Pa·s | 100 | 43000 | 1500 |
| | Minimum complex viscosity (temperature) | — | Pa·s | 5 (68° C.) | 2400 (172° C.) | 50 (121° C.) |
| Cured product | Adhesion strength | Rolled steel plate | MPa | 26 | 8 | 14 |
| | Dielectric voltage | 25° C. | kV | ○ | x | ○ |

The sheet-form insulating varnish of each of Examples 1-6 has excellent flexibility and releasability and has a compression rate of at least 20%, immediately after the production and after the elapse of thirty days. Crazing does not occur on the enamel wires. The storage shear modulus at 25° C. falls in a range of $1.0 \times 10^3$ Pa to $5.0 \times 10^4$ Pa, and the smallest value thereof is present at 80° C. to 150° C. and falls in a range of 10 Pa to $2.0 \times 10^3$ Pa. The loss elastic modulus at 25° C. falls in a range of $1.0 \times 10^3$ Pa to $5.0 \times 10^4$ Pa, and the smallest value thereof is present at 80° C. to 150° C. and falls in a range of 10 Pa to $2.0 \times 10^3$ Pa.

The local maximum value of the loss tangent is present at 80° C. to 150° C. and falls in a range of 1.0 to 3.5. The complex viscosity at 25° C. falls in a range of $6.0 \times 10^2$ Pa·s to $1.0 \times 10^4$ Pa·s, and the smallest value thereof is present at 80° C. to 150° C. and is not greater than 500 Pa·s. From the above-described evaluation results, it is clear that the sheet-form insulating varnish of each of Examples 1-6 is compressed into the predetermined thickness by pressure application at normal temperature and allows permeability into the narrow space between the members to be obtained by heating at the time of curing.

In addition, the sheet-form insulating varnish of each of Examples 1-6 has, at 25° C., an adhesion strength not less than 20 MPa and can firmly adhere and fix the insulation target members to each other. Furthermore, the sheet-form insulating varnish has high dielectric voltage after being cured, and has excellent insulation reliability. Moreover, no difference in flexibility and compression rate is made after thirty days of preservation at 40° C. Thus, at normal temperature, the progress of a reaction is slow, and the usable time is long.

The formula of Comparative example 1 is different from the formula of Example 1 in that Comparative example 1 contains the curing agent (3-3) which is reactive at normal temperature. The formula of Comparative example 2 is different from the formula of Example 4 in that Comparative example 2 contains the curing agent (3-5) having a 10-hour half-life temperature of 36.5° C. Therefore, in the sheet-form insulating varnish of each of Comparative example 1 and Comparative example 2, a reaction progresses at normal temperature in a state where the sheet-form insulating varnish is left at rest, and the physical properties change over time, whereby a problem arises in terms of usable time. After the elapse of thirty days, the flexibility and the adhesiveness are lost, and the compression rate becomes 0%. Therefore, the fluidity at the time of curing due to heating is low, permeability into a minute gap is not obtained, and the sheet-form insulating varnish is inferior in terms of force of adhesion with the members. In addition, a crack and separation occur by bending at the time of use, whereby workability becomes poor.

In addition, the formula of Comparative example 3 is different from the formula of Example 5 in that the mass ratio of the solid-form thermosetting resin (A) to the liquid-form thermosetting resin (B) is 90/10, and more solid-form resin is contained. Thus, Comparative example 3 has a low sheet toughness, does not have flexibility and adhesiveness, and has a low compression rate and a low dielectric voltage. Meanwhile, in Comparative example 4, said mass ratio is 10/90, and more liquid-form resin is contained. Thus, Comparative example 4 has fluidity at normal temperature even after drying. Therefore, a stable sheet state is not obtained, and Comparative example 4 cannot be separated as a sheet.

The formula of Comparative example 5 is different from the formula of Example 1 in that Comparative example 5 contains, as an inorganic filler, the crystalline silica (7-2) having a maximum particle diameter of 550 μm and having an average particle diameter of 200 μm. Thus, Comparative example 5 has a low sheet toughness, does not have flexibility and adhesiveness, and has a compression rate of 0% and a low dielectric voltage. Although the formula of Comparative example 6 is the same as the formula of Example 2, Comparative example 6 is insufficiently dried, and much diluent in the slurry remains. Therefore, a stable sheet state is not obtained, and Comparative example 6 cannot be separated as a sheet. Furthermore, when Comparative example 6 is brought into contact with a coil and used, a crack is induced, by crazing, on the coating of the enamel wire, and the coil insulation properties are caused to deteriorate. As described above, in Examples 1-6, all evaluation items were favorable. Meanwhile, Comparative examples 1-6 were found to be inferior in terms of some of the evaluation items.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A sheet-form insulating varnish to be disposed in a gap between insulation target members, at least a part of the gap having a fixed dimension, formed from a thermosetting resin composition in an uncured or semi-cured state, in a sheet form with predetermined film thickness,
   wherein the thermosetting resin composition contains:
   a thermosetting resin (A) that is in solid form at 25° C.;
   a thermosetting resin (B) that is in liquid form at 25° C.;
   a latent curing agent that is unreactive at 60° C. or lower; and
   an inorganic filler having a maximum particle diameter smaller than the dimension of the gap and having an average particle diameter smaller than 0.5 times the dimension of the gap, wherein
   an amount of the thermosetting resin (A) per a total of 100 parts by mass of the thermosetting resin (A) and the thermosetting resin (B) is in a range of 30 parts by mass to 70 parts by mass, and
   a volume ratio of the inorganic filler to an entirety of the composition is not higher than 50%,
   wherein the sheet-form insulating varnish has a compression rate that reduces the film thickness by at least 10% under a pressure of 25 MPa at 25° C.,
   wherein the sheet-form insulating varnish satisfies at least one of:
   (A) the sheet-form insulating varnish has, at 25° C., a storage shear modulus that is in a range of $1.0 \times 10^3$ Pa to $5.0 \times 10^4$ Pa, and a smallest value of the storage shear modulus is present in a range of 80° C. to 150° C. and is in a range of 10 Pa to $2.0 \times 10^3$ Pa, or
   (B) the sheet-form insulating varnish has, at 25° C., a complex viscosity that is in a range of $6.0 \times 10^2$ Pa·s to $1.0\times10^4$ Pa·s, and a smallest value of the complex viscosity is present in a range of 80° C. to 150° C. and is not greater than $5.0\times10^2$ Pa·s.

2. The sheet-form insulating varnish according to claim 1, wherein each of the thermosetting resin (A) and the thermosetting resin (B) contains at least one of an epoxy resin, a phenolic resin, and an unsaturated polyester resin.

3. The sheet-form insulating varnish according to claim 1, wherein the thermosetting resin (A) is an epoxy resin having a softening point that is in a range of 50° C. to 160° C.

4. The sheet-form insulating varnish according to claim 1, wherein the latent curing agent is any of a boron trifluoride-amine complex, dicyandiamide, and an organic acid hydrazide.

5. The sheet-form insulating varnish according to claim 1, the thermosetting resin composition further containing a curing accelerator that is unreactive at 60° C. or lower.

6. The sheet-form insulating varnish according to claim 1, the thermosetting resin composition further containing a thermoplastic resin having a weight average molecular weight that is in a range of 10,000 to 100,000, wherein an amount of the thermoplastic resin per a total of 100 parts by mass of the thermosetting resin (A) and the thermosetting resin (B) is in a range of 1 part by mass to 40 parts by mass.

7. The sheet-form insulating varnish according to claim 6, wherein the thermoplastic resin is a phenoxy resin or a polyester resin.

8. The sheet-form insulating varnish according to claim 1, wherein the sheet-form insulating varnish is formed from the thermosetting resin composition in an uncured or semi-cured state, in a sheet form with a film thickness that is in a range of 1 μm to 500 μm.

9. The sheet-form insulating varnish according to claim 8, wherein the film thickness is set to be not smaller than 1.1 times the dimension of the gap.

10. The sheet-form insulating varnish according to claim 8, wherein a non-volatile content per a total of 100 parts by mass of the sheet-form insulating varnish is not less than 97 parts by mass.

11. The sheet-form insulating varnish according to claim 8, wherein
the sheet-form insulating varnish has, at 25° C., a storage shear modulus that is in a range of $1.0\times10^3$ Pa to $5.0\times10^4$ Pa, and
a smallest value of the storage shear modulus is present in a range of 80° C. to 150° C. and is in a range of 10 Pa to $2.0\times10^3$ Pa.

12. The sheet-form insulating varnish according to claim 8, wherein
the sheet-form insulating varnish has, at 25° C., a complex viscosity that is in a range of $6.0\times10^2$ Pa·s to $1.0\times10^4$ Pa·s, and
a smallest value of the complex viscosity is present in a range of 80° C. to 150° C. and is not greater than $5.0\times10^2$ Pa·s.

13. The sheet-form insulating varnish according to claim 8, wherein, when the sheet-form insulating varnish is disposed in the gap between the members, a force of adhesion with the members is not less than 20 N/m.

14. The sheet-form insulating varnish according to claim 8, wherein a release film or a release paper sheet is disposed on one surface of the sheet-form insulating varnish.

15. An electrical device comprising: a substrate on which an electronic part is mounted; and a housing to which the substrate is fixed, wherein
(i) the sheet-form insulating varnish according to claim 8 is disposed in a gap between the electronic part and the substrate, wherein the inorganic filler in the thermosetting resin composition from which the sheet-form insulating varnish is formed has a maximum particle diameter smaller than the dimension of the gap between the electronic part and the substrate and has an average particle diameter smaller than 0.5 times the dimension of the gap between the electronic part and the substrate, or
(ii) the sheet-form insulating varnish according to claim 8 is disposed in a gap between the substrate and the housing, wherein the inorganic filler in the thermosetting resin composition from which the sheet-form insulating varnish is formed has a maximum particle diameter smaller than the dimension of the gap between the substrate and the housing and has an average particle diameter smaller than 0.5 times the dimension of the gap between the substrate and the housing.

16. A rotary electric machine in which a stator coil is accommodated in a slot of a stator core, wherein
the sheet-form insulating varnish according to claim 8 is disposed in a gap between the stator coil and an inner wall of the slot, wherein the inorganic filler in the thermosetting resin composition from which the sheet-form insulating varnish is formed has a maximum particle diameter smaller than the dimension of the gap between the stator coil and the inner wall of the slot and has an average particle diameter smaller than 0.5 times the dimension of the gap between the stator coil and the inner wall of the slot.

17. The rotary electric machine according to claim 16, wherein
an insulating paper sheet is disposed in the gap, and
the sheet-form insulating varnish is disposed on a side of the insulating paper sheet that faces the stator coil, or on each side of the insulating paper sheet.

* * * * *